US011567920B2

(12) United States Patent
Gilbert et al.

(10) Patent No.: US 11,567,920 B2
(45) Date of Patent: Jan. 31, 2023

(54) MASTER DATA MAPPING SCHEME PERMITTING QUERYING

(71) Applicant: SAP SE, Walldorf (DE)

(72) Inventors: Johannes Gilbert, Hessen (DE); Simon Hoinkis, Bammental (DE); Martin Dreier, St. Leon-Rot (DE)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 17/021,615

(22) Filed: Sep. 15, 2020

(65) Prior Publication Data

US 2022/0083526 A1      Mar. 17, 2022

(51) Int. Cl.
*G06F 16/22*      (2019.01)
*G06F 16/28*      (2019.01)
*G06F 16/84*      (2019.01)
*G06F 16/2457*      (2019.01)
*G06F 16/2455*      (2019.01)

(52) U.S. Cl.
CPC .... *G06F 16/2282* (2019.01); *G06F 16/24561* (2019.01); *G06F 16/24573* (2019.01); *G06F 16/288* (2019.01); *G06F 16/86* (2019.01)

(58) Field of Classification Search
CPC .......... G06F 16/2282; G06F 16/24573; G06F 16/24561; G06F 16/86; G06F 16/288
See application file for complete search history.

(56) References Cited

U.S. PATENT DOCUMENTS

| | | | | |
|---|---|---|---|---|
| 6,052,687 A * | 4/2000 | Miura | ................... | G06F 16/284 |
| 6,898,590 B1 * | 5/2005 | Streifer | ................. | G06F 16/284 |
| 7,099,898 B1 * | 8/2006 | Nakamura | ............ | G06F 16/284 |
| | | | | 707/999.203 |
| 7,362,742 B1 * | 4/2008 | Siddiqi | ................... | H04L 45/00 |
| | | | | 370/350 |
| 7,680,828 B2 * | 3/2010 | Gorelik | ................... | G06F 16/00 |
| | | | | 707/763 |
| 7,739,223 B2 * | 6/2010 | Vaschillo | ................ | G06F 16/25 |

(Continued)

OTHER PUBLICATIONS

Anonymous "Customer/Vendor Integration", Jun. 30, 2020, 3 pages.
Leach, et al. "A Universally Unique Identifier (UUID) URN Namespace", Datapower Technology, Inc., Jul. 2005, 32 pages.

*Primary Examiner* — Miranda Le
(74) *Attorney, Agent, or Firm* — Fountainhead Law Group P.C.

(57) ABSTRACT

Embodiments permit searching across different system landscapes, for data associated with master data objects. A map is constructed comprising (explicit, inferred) connections between different pieces of data located in various databases, systems, and landscapes. In certain embodiments the map is constructed utilizing a parameter (e.g., family name) present in a received query, as a boundary condition. The map may be in tabular form, and may conform to a particular notation scheme. Once the map is constructed, the query is executed thereupon to search for relevant data. The corresponding query result is received and stored, ultimately for communication back to the user posing the original query. Embodiments may be particularly suited to returning private data of a unique entity (e.g., natural person, corporation, juristical person) that is stored over a variety of different master data objects (e.g., employee, customer, supplier) and across complex system landscapes.

10 Claims, 35 Drawing Sheets

(56) References Cited

U.S. PATENT DOCUMENTS

| | | | | |
|---|---|---|---|---|
| 8,055,661 B2* | 11/2011 | Lee | ................ | G06F 16/367 |
| | | | | 707/740 |
| 8,600,925 B2* | 12/2013 | Vickers | ................ | G06F 16/25 |
| | | | | 706/50 |
| 8,914,608 B2* | 12/2014 | Oh | ................ | G06F 12/1009 |
| | | | | 711/202 |
| 9,015,171 B2* | 4/2015 | Bayliss | ................ | G06Q 10/10 |
| | | | | 707/739 |
| 2003/0028551 A1* | 2/2003 | Sutherland | ................ | G06F 16/252 |
| 2006/0004854 A1* | 1/2006 | Okunseinde | ................ | G06F 16/25 |
| 2008/0281842 A1* | 11/2008 | Nguyen | ................ | G06F 16/86 |
| 2010/0138592 A1* | 6/2010 | Cheon | ................ | G06F 12/0246 |
| | | | | 711/103 |
| 2012/0173589 A1* | 7/2012 | Kwon | ................ | G06F 16/2282 |
| | | | | 707/803 |
| 2013/0311518 A1* | 11/2013 | Agbaria | ................ | G06F 16/2379 |
| | | | | 707/E17.044 |
| 2015/0227607 A1* | 8/2015 | Rich | ................ | G06F 16/283 |
| | | | | 707/602 |

\* cited by examiner

FIG. 3A

Database table CUSTOMER

| Cust.No. | PRENAME | SURNAME | ... |
|---|---|---|---|
| 4711 | Paul | Yee | ... |
| 4712 | Chris | Chen | ... |
| ... | | | |

FIG. 3B

Database table SUPPLIER

| Sup.No. | NAME | ... |
|---|---|---|
| 4711 | X Ltd. | ... |
| 8150 | A Corp. | ... |
| ... | | |

FIG. 3C — System S$_1$

Database table CUSTOMER

| Cust.No. | PRENAME | SURNAME | ... |
|---|---|---|---|
| 4711 | Paul | Yee | ... |
| 4712 | Chris | Chen | ... |
| ... | | | |

Database table SUPPLIER

| Sup.No. | NAME | ... |
|---|---|---|
| 5164 | X Ltd. | ... |
| 8150 | A Corp. | ... |
| ... | | |

FIG. 3D — System S$_2$

Database table CUSTOMER

| Cust.No | PRENAME | SURNAME | ... |
|---|---|---|---|
| 4711 | Sam | Miller | ... |
| 8150 | Don | Balmer | ... |
| ... | | | |

Database table SUPPLIER

| Sup.No. | NAME | ... |
|---|---|---|
| 5164 | Lucky Ltd. | ... |
| 4712 | Go Corp. | ... |
| ... | | |

FIG. 4A

Database table CUSTOMER

| Cust.No. | PRENAME | SURNAME | ... |
|---|---|---|---|
| 4711 | Paul | Yee | ... |
| 4712 | Chris | Chen | ... |
| ... | ... | ... | ... |

FIG. 4B

Database table SUPPLIER

| Sup.No. | NAME | ... |
|---|---|---|
| 4711 | X Ltd. | ... |
| 8150 | A Corp. | ... |
| ... | ... | ... |

System S₁

FIG. 4C

Database table CUSTOMER

| Cust.No. | PRENAME | SURNAME | ... |
|---|---|---|---|
| 4711 | Paul | Yee | ... |
| 4712 | Chris | Chen | ... |
| ... | ... | ... | ... |

Database table SUPPLIER

| Sup.No. | NAME | ... |
|---|---|---|
| 5164 | X Ltd. | ... |
| 8150 | A Corp. | ... |
| ... | ... | ... |

System S₂

FIG. 4D

Database table CUSTOMER

| Cust.No. | PRENAME | SURNAME | ... |
|---|---|---|---|
| 4711 | Sam | Miller | ... |
| 8150 | Don | Balmer | ... |
| ... | ... | ... | ... |

Database table SUPPLIER

| Sup.No. | NAME | ... |
|---|---|---|
| 5164 | Lucky Ltd. | ... |
| 4712 | Go Corp. | ... |
| ... | ... | ... |

FIG. 7A

Mapping information (directly) available in system $S_1$

| # | Source system's own given ID | Source master data entity type | Source master data entity ID | Target destination | Target system's own given ID | Target master data entity type | Target master data entity ID | Received via destination |
|---|---|---|---|---|---|---|---|---|
| 1 | $S_1$ | Customer | 1 | $S_1D_1$ | $S_2$ | Customer | 1 | -/- |
| 2 | $S_1$ | Supplier | 2 | $S_1D_1$ | $S_2$ | Supplier | 3 | -/- |
| 3 | $S_1$ | Customer | 3 | $S_1D_2$ | $S_3$ | Customer | 3 | -/- |

FIG. 7B

Mapping information (directly) available in system $S_3$

| # | System's own given ID | Source master data entity type | Source master data entity ID | Target destination | Target system's own given ID | Target master data entity type | Target master data entity ID | Received via destination |
|---|---|---|---|---|---|---|---|---|
| 1 | $S_3$ | Customer | 3 | $S_3D_1$ | $S_4$ | Customer | 3 | -/- |

FIG. 8A
<<*piece of information*>>
<system>:<entity type>:<ID>
FIG. 8B
<<*destination*>>
<system>:<destination>
FIG. 8C
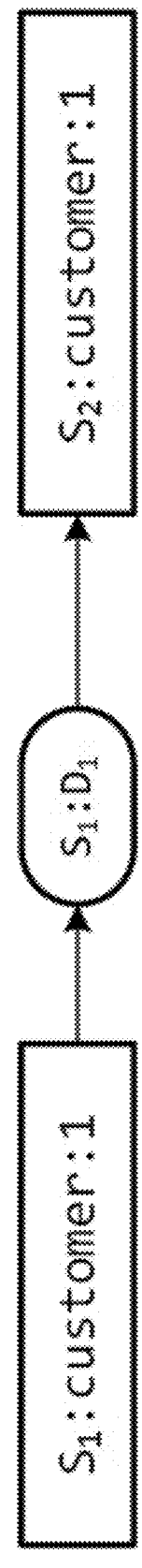
FIG. 8D
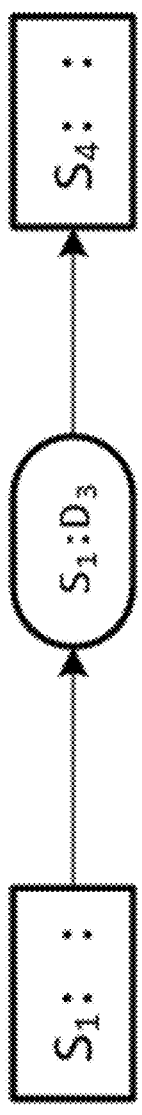

| # | System's own given ID | Mapping information (directly) available in system $S_1$ | | | | | |
|---|---|---|---|---|---|---|---|
| | | Source master data entity type | Source master data entity ID | Target destination | Target system's own given ID | Target master data entity type | Target master data entity ID | Received via destination |
| 1 | $S_1$ | Customer | 1 | $S_1D_1$ | $S_2$ | Customer | 1 | -/- |
| 2 | $S_1$ | Supplier | 2 | $S_1D_1$ | $S_2$ | Supplier | 3 | -/- |
| 3 | $S_1$ | Customer | 3 | $S_1D_2$ | $S_3$ | Customer | 3 | -/- |
| 4 | $S_5$ | Customer | 3 | $S_3D_1$ | $S_4$ | Customer | 3 | $S_3D_2$ |

FIG. 10

| Mapping information available in system $S_1$ (incl. inferred information) | | | | | | | |
|---|---|---|---|---|---|---|---|
| # | System's own given ID | Source master data entity type | Source master data entity ID | Target destination | Target system's own given ID | Target master data entity type | Target master data entity ID | Received via destination |
| 1 | $S_1$ | Customer | 1 | $S_1D_1$ | $S_2$ | Customer | 1 | -/- |
| 2 | $S_1$ | Supplier | 2 | $S_1D_1$ | $S_2$ | Supplier | 3 | -/- |
| 3 | $S_1$ | Customer | 3 | $S_1D_2$ | $S_3$ | Customer | 3 | -/- |
| 4 | $S_1$ | Customer | 3 | $S_1D_1$ | $S_4$ | Customer | 3 | $S_1D_2$ |
| 5 | $S_1$ | Customer | 3 | $S_1D_3$ | $S_4$ | Customer | 3 | -/- |

| | | Mapping information (directly) available in system $S_1$ | | | | | |
|---|---|---|---|---|---|---|---|
| # | System's own given ID | Source master data entity type | Source master data entity ID | Target destination | Target system's own given ID | Target master data entity type | Target master data entity ID | Received via destination |
| 1 | $S_1$ | Partner | 1 | NONE | $S_1$ | Customer | 2 | -/- |
| 2 | $S_1$ | Customer | 2 | $S_1D_1$ | $S_2$ | Customer | 2 | -/- |
| 3 | $S_1$ | Customer | 2 | $S_1D_2$ | $S_3$ | Customer | 2 | -/- |

FIG. 17B

| | | Mapping information (directly) available in system $S_3$ | | | | | |
|---|---|---|---|---|---|---|---|
| # | System's own given ID | Source master data entity type | Source master data entity ID | Target destination | Target system's own given ID | Target master data entity type | Target master data entity ID | Received via destination |
| 1 | $S_3$ | Customer | 2 | NONE | $S_3$ | Partner | 3 | -/- |
| 2 | $S_3$ | Partner | 3 | $S_3D_1$ | $S_4$ | Customer | 3 | -/- |

| Step # | Action | Location | Input | Output |
|---|---|---|---|---|
| 1 | Gather all mapping information available in the current system on 1..n master data entities existing in the current system (MDES$_1$). | Current system | MDES$_1$ = 1..n master data entities existing in the current system | • MI$_1$ = mapping information for all entities of MDES$_1$<br>• MDES$_2$ = 0..n additional master data entities existing in the current or another system that are not already comprised in MDES$_1$ |
| 2 | Separate MDES$_2$ into entities that exist in the current system (= MDES$_3$) and the ones that exist other systems (= MDES$_4$) | Current system | MDES$_2$ | • MDES$_3$ = Subset of MDES$_2$ that exist in the current system<br>• MDES$_4$ = Subset of MDES$_2$ that exist in another system |
| 3 | In case MDES$_3$ is not empty repeat step 1 to 3 for all entities in MDES$_3$. | Current system | MDES$_3$ | -/- |
| 4 | Consolidate all sets MDES$_1$ to MDES$_4$ (due to repeats there might be several sets MDES$_1$, MDES$_2$, MDES$_3$ and MDES$_4$)<br>And<br>Consolidate all sets MI$_1$ (due to the repeats there might be several sets MI$_1$) | Current system | • MDES$_1$, MDES$_2$, MDES$_3$, MDES$_4$ (and all their potential versions due to repeats)<br>• MI$_1$ (and all its potential versions due to repeats) | • MDES$_5$ = Consolidation of MDES$_1$, MDES$_2$, MDES$_3$, MDES$_4$ (and all their potential versions due to repeats). MDES$_5$ does not contain duplicates.<br>• MI$_2$ = Consolidation of MI$_1$ and all its potential versions due to repeats. MI$_2$ does not contain duplicates. |

FIG. 22A

| | | | |
|---|---|---|---|
| 5 | Gather information on all connections available in the current system | Current system | -/- | $C_1$ = Set of available connections |
| 6 | Check if the information gathered so far shall be passed back to the calling system (no further steps are executed in the current system) or if just the next steps shall be performed (default). | Current system | $I_1$ = Control flow indicator for described check; possible values are '1-6' or 'all' | $MDES_5$, $C_1$ and $MI_2$ in case no further steps are executed ($I_1$='1-6') or no output if further steps are executed ($I_1$='all') |
| 7 | Trigger steps 1 to 6 in all connected systems as per $C_1$ (see step 5) | Remote system(s) | $MDES_5$, $MI_2$ and $I_1 = 1$-6 (see step 6) | -/- |
| 8 | Receive all sets $MDES_5'$, all sets $MI_2'$ and all sets $C_1'$ from the remote system(s) | Current system | -/- | • $MDES_5'$ (= $MDES_5$ in a remote system)<br>• $MI_2'$ (= $MI_2$ in a remote system)<br>• $C_1'$ (= $C_1$ in a remote system) |
| 9 | Consolidate all sets $MDES_5'$ with $MDES_5$, all sets $MI_2'$ with $MI_2$ and all sets $C_1'$ with $C_1$. | Current system | All sets $MDES_5'$, $MDES_5$, all sets $MI_2'$, $MI_2$, all sets $C_1'$ and $C_1$ | • $MDES_6$ = Consolidation of all sets $MDES_5'$ and $MDES_5$<br>• $MI_3$ = Consolidation of all sets $MI_2'$ and $MI_2$<br>• $C_2$ = Consolidation of all set $C_1'$ and $C_1$ |

FIG. 22B

| 10 | Compare $MI_2$ and $MI_3$ to indicate if $MI_3$ contains new mapping information compared to $MI_2$. | Current system | $MI_2$ and $MI_3$ | | |
| --- | --- | --- | --- | --- | --- |
| 11 | Check if new mapping information is available ($I_2$). If so, continue with step 1 using $MDES_6$ as input. If not, the process ends. | Current system | $I_2$ | | $I_2$ = Control flow indicator for described check; possible values are 'new mapping information available' and 'no new mapping information available' -/- |

FIG. 22C

| System $S_1$ - step 1 | |
|---|---|
| $MDES_1$ | $S_1$:partner:1 |
| $MI_1$ | $S_1$:partner:1 maps to $S_2$:customer:1 |
| $MDES_2$ | $S_2$:customer:1 |

FIG. 30A

| System $S_1$ - step 2 | |
|---|---|
| $MDES_3$ | (empty) |
| $MDES_4$ | $S_2$:customer:1 |

FIG. 30B

| System $S_1$ - steps 4 and 5 | |
|---|---|
| $MDES_5$ | $S_1$:partner:1, $S_2$:customer:1 |
| $MI_2$ | $S_1$:partner:1 maps to $S_2$:customer:1 |
| $C_1$ | $S_1D_1$, $S_1D_2$, $S_1D_3$ |

FIG. 30C

| System $S_2$ - step 1 | |
|---|---|
| $MDES_1$ | $S_2$:customer:1 |
| $MI_1$ | $S_2$:customer:1 maps to $S_2$:customer:3 |
| $MDES_2$ | $S_2$:customer:3 |

FIG. 30D

| System $S_2$ - step 2 | |
|---|---|
| $MDES_3$ | $S_2$:customer:3 |
| $MDES_4$ | (empty) |

FIG. 30E

| System $S_2$ - step 1 - 2nd iteration | |
|---|---|
| $MDES_1'$ | $S_2$:customer:3 |
| $MI_1'$ | $S_2$:customer:3 maps to $S_1$:customer:2 |
| $MDES_2'$ | $S_1$:customer:2 |

FIG. 30F

| System $S_2$ - step 2 - 2nd iteration | |
|---|---|
| $MDES_3'$ | (empty) |
| $MDES_4'$ | $S_1$:customer:2 |

FIG. 30G

| System $S_2$ - steps 4 and 5 | |
|---|---|
| $MDES_5$ | $S_2$:customer:1, $S_2$:customer:3, $S_1$:customer:2 |
| $MI_2$ | $S_2$:customer:1 maps to $S_2$:customer:3, $S_2$:customer:3 maps to $S_1$:customer:2 |
| $C_1$ | $S_2D_1$, $S_2D_2$ |

FIG. 30H

| System $S_1$ - step 8 | |
|---|---|
| $MDES_5'$ | $S_2$:customer:1, $S_2$:customer:3, $S_1$:customer:2 |
| $MI_2'$ | $S_2$:customer:1 maps to $S_2$:customer:3, $S_2$:customer:3 maps to $S_1$:customer:2 |
| $C_1'$ | $S_2D_1$, $S_2D_2$ |

FIG. 30I

| System $S_1$ - step 9 | |
|---|---|
| $MDES_6$ | $S_1$:partner:1, $S_2$:customer:1, $S_2$:customer:3, $S_1$:customer:2, $S_1$:customer:3 |
| $MI_3$ | $S_1$:partner:1 maps to $S_2$:customer:1, $S_2$:customer:1 maps to $S_2$:customer:3, $S_2$:customer:3 maps to $S_1$:customer:2 |
| $C_2$ | $S_1D_1$, $S_1D_2$, $S_1D_3$, $S_2D_1$, $S_2D_2$ |

FIG. 30J

| System $S_1$ - step 1 - 2nd iteration | |
|---|---|
| $MDES_1$ | $S_1$:partner:1, $S_2$:customer:1, $S_2$:customer:1, $S_2$:customer:3, $S_1$:customer:2 |
| $MI_1$ | $S_1$:partner:1 maps to $S_2$:customer:1, $S_2$:customer:1 maps to $S_2$:customer:3, $S_2$:customer:3 maps to $S_1$:customer:2, $S_1$:customer:3 maps to $S_3$:customer:2 |
| $MDES_2$ | $S_3$:customer:2 |

FIG. 30K

| System $S_1$ - step 2 - 2nd iteration | |
|---|---|
| $MDES_3$ | (empty) |
| $MDES_4$ | $S_3$:customer:2 |

FIG. 30L

| System $S_1$ - steps 4 and 5 - 2nd iteration | |
|---|---|
| $MDES_5$ | $S_1$:partner:1, $S_2$:customer:1, $S_2$:customer:1, $S_2$:customer:3, $S_1$:customer:2, $S_3$:customer:2 |
| $MI_2$ | $S_1$:partner:1 maps to $S_2$:customer:1 |
| $C_1$ | $S_1D_1$, $S_1D_2$, $S_1D_3$ |

FIG. 30M

| System $S_3$ - step 1 | |
|---|---|
| $MDES_1$ | $S_3$:customer:2 |
| $MI_1$ | $S_3$:customer:2 maps to $S_3$:partner:3 |
| $MDES_2$ | $S_3$:partner:3 |

FIG. 30N

| System $S_3$ - step 2 | |
|---|---|
| $MDES_3$ | $S_3$:partner:3 |
| $MDES_4$ | (empty) |

FIG. 30O

| System $S_3$ - step 1 - 2nd iteration | |
|---|---|
| $MDES_1'$ | $S_3$:partner:3 |
| $MI_1'$ | $S_3$:partner:3 maps to $S_4$:customer:3 |
| $MDES_2$ | $S_4$:customer:3 |

FIG. 30P

| System $S_3$ - step 2 - 2nd iteration | |
|---|---|
| MDES$_3$' | (empty) |
| MDES$_4$' | $S_4$:customer:3 |

FIG. 30Q

| System $S_3$ - steps 4 and 5 | |
|---|---|
| MDES$_5$ | $S_3$:customer:2, $S_3$:partner:3, $S_4$:customer:3 |
| MI$_2$ | $S_3$:customer:2 maps to $S_3$:partner:3, $S_3$:partner:3 maps to $S_4$:customer:3 |
| C$_1$ | $S_3D_1$ |

FIG. 30R

| System $S_1$ - step 8 - 2nd iteration | |
|---|---|
| MDES$_5$' | $S_3$:customer:2, $S_3$:partner:3, $S_4$:customer:3 |
| MI$_2$' | $S_3$:customer:2 maps to $S_3$:partner:3, $S_3$:partner:3 maps to $S_4$:customer:3 |
| C$_1$' | $S_3D_1$ |

FIG. 30S

| System $S_1$ - step 9 - 2nd iteration | |
|---|---|
| MDES$_6$ | $S_1$:partner:1, $S_2$:customer:1, $S_2$:customer:3, $S_1$:customer:2, $S_1$:customer:3, $S_3$:customer:2, $S_3$:partner:3, $S_4$:customer:3 |
| MI$_3$ | $S_1$:partner:1 maps to $S_2$:customer:1, $S_2$:customer:1 maps to $S_2$:customer:3, $S_2$:customer:3 maps to $S_1$:customer:2, $S_1$:customer:2 maps to $S_1$:customer:3, $S_1$:customer:3 maps to $S_3$:customer:2, $S_3$:customer:2 maps to $S_3$:partner:3, $S_3$:partner:3 maps to $S_4$:customer:3 |
| C$_2$ | $S_1D_1$, $S_1D_2$, $S_1D_3$, $S_2D_1$, $S_2D_2$, $S_3D_1$ |

FIG. 30T

MASTER DATA MAPPING SCHEME PERMITTING QUERYING

BACKGROUND

Unless otherwise indicated herein, the approaches described in this section are not prior art to the claims in this application and are not admitted to be prior art by inclusion in this section.

A natural person can be represented by multiple master data entities, such as customers, suppliers, and employees. While in some cases such master data entities may be located in a same software system, alternatively they may be (potentially widely) distributed across a larger landscape made up of suite(s) of a number of different software systems.

Software processes may need to deal with more than one representation of a natural person in order to effectively perform required tasks. In order to accomplish this with accuracy and efficiency, it may be desirable to keep track of master data information in an organized and centralized manner.

SUMMARY

Embodiments permit searching across different system landscapes, for data associated with master data objects. A map is constructed comprising (explicit, inferred) connections between different pieces of data located in various databases, systems, and system landscapes. In certain embodiments the map is constructed utilizing a parameter (e.g., family name) present in a received query, as a boundary condition. The map may be in tabular form, and may conform to a particular notation scheme. Once the map is constructed, the query is executed thereupon to search for relevant data. The corresponding query result is received and stored, ultimately for communication back to the user posing the query.

Embodiments may be particularly suited to returning private data of a unique entity (e.g., natural person, corporation, or juristical person) stored over a variety of different master data objects (employee, customer, supplier) across complex system landscapes.

The following detailed description and accompanying drawings provide a better understanding of the nature and advantages of various embodiments.

BRIEF DESCRIPTION OF THE DRAWINGS

FIGS. 3A-D are tables including master data information in an example.

FIGS. 4A-D present tables including master data information in another example.

FIGS. 7A-B are tables showing mapping information.

FIGS. 8A-D show various elements of a mapping notation scheme.

FIG. 10 is a table of mapping information.

FIG. 15 shows representation of inferred mapping information in a table.

FIGS. 17A-B are tables of mapping information from the system of FIG. 16.

FIGS. 22A-C show one possible querying approach.

FIGS. 30A-T illustrate a querying approach according to an embodiment.

DETAILED DESCRIPTION

Described herein are methods and apparatuses that implement master data mapping and querying. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments permit searching across different system landscapes, for data associated with master data objects. A map is constructed comprising (explicit, inferred) connections between different pieces of data located in various databases, systems, and system landscapes. In certain embodiments the map is constructed utilizing a parameter (e.g., family name) present in a received query, as a boundary condition. The map may be in tabular form, and may conform to a particular notation scheme. Once the map is constructed, the query is executed thereupon to search for relevant data. The corresponding query result is received and stored, ultimately for communication back to the user posing the query. Embodiments may be particularly suited to returning private data of a natural person, stored over a variety of different master data objects (employee, customer, supplier) across complex system landscapes.

Figure 1:
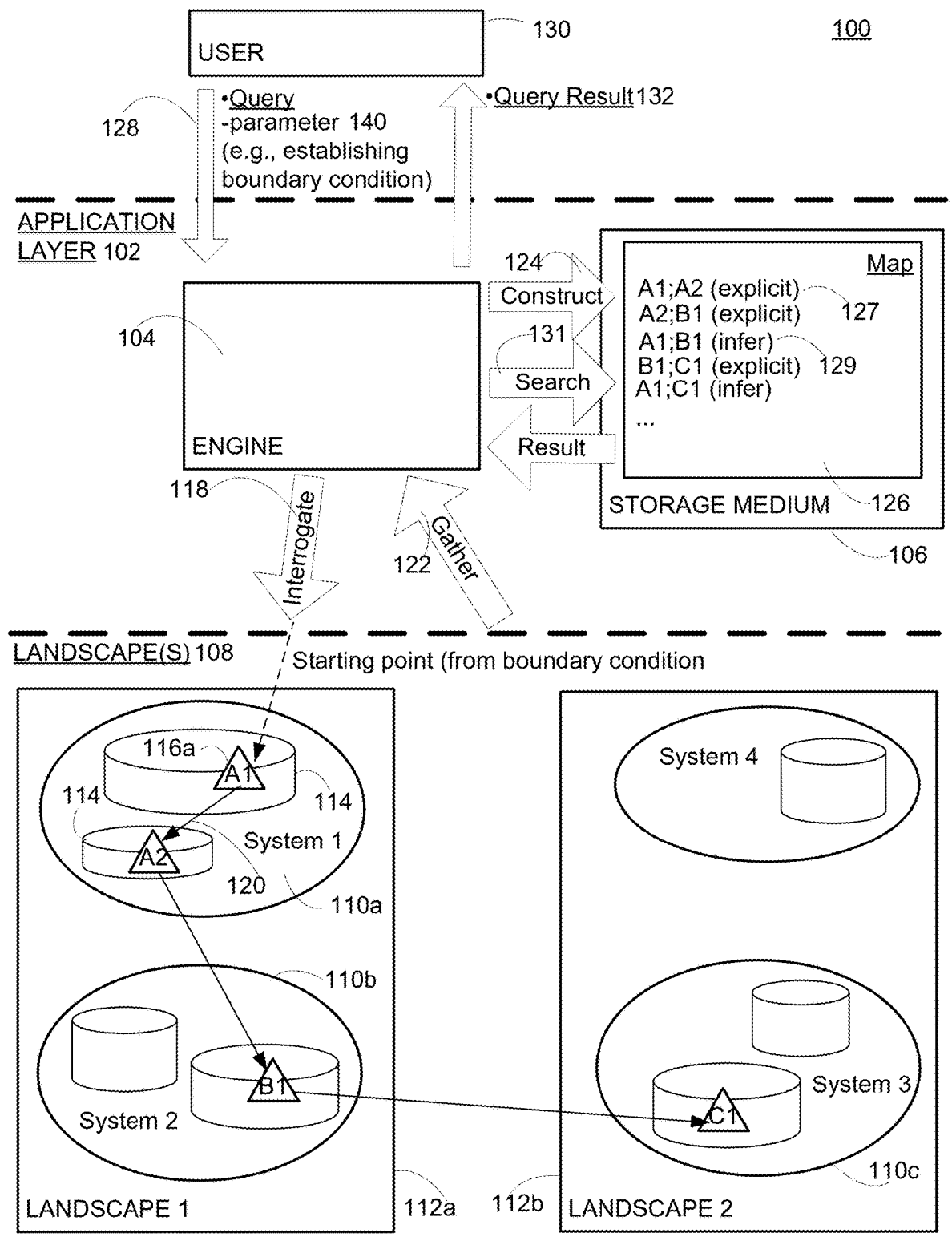
FIG. 1 shows a simplified diagram of a system according to an embodiment.

FIG. 1 shows a simplified view of an example system that is configured to implement data mapping and querying according to an embodiment. Specifically, system 100 comprises an application layer 102 comprising a processing engine 104 that is in communication with a non-transitory computer readable storage medium 106.

The processing engine is in communication with a layer 108 comprising a number of different systems 110 that are distributed across multiple landscapes 112. Each system comprises different databases 114, which may include master data information 116 relevant to particular unique entity (e.g., a natural person).

Accordingly, the processing engine is configured to interrogate 118 the systems within the landscape layer. And, based upon linkages 120 (e.g., read permission) present between the database information, the engine is configured to gather 122 master data information relevant to the unique entity.

Using this collected master data information, the engine is further configured to construct 124 a map 126 thereof, and to store the map in the non-transitory computer readable storage medium. As described in detail below, the map may:

conform to a particular mapping notation scheme (e.g., at shown at least in FIGS. 8A-D);

be in tabular form (e.g., as shown at least in FIGS. 17A-B); and/or comprise entries representing explicit connections 127 and also inferred connections 129.

Further details regarding map construction according to particular embodiments, are provided later below in connection with the example.

Then, based upon a query 128 received from a user 130, the engine is configured to search 131 the map to return a query result 132 with comprehensive information relevant to the unique entity.

While the above description has characterized map construction of the map as preceding receipt of the query, this is not required. Specifically, in certain environments the data volume of the landscape layer could be very large and complex.

Under such circumstances, rather than constructing a map relevant to all possible unique entities, the engine could instead commence with reference to parameter(s) 140 of the received query, which serve to establish a boundary condition (e.g., starting point) for map creation. An example of a parameter establishing such a boundary condition, could be a portion of the formal name (e.g., family name in a query) that is used as a starting point for constructing the map.

In the generalized embodiment of FIG. 1, this boundary condition could provide a starting point for the engine's interrogation of the landscape 112a to recognize the relevance of the piece of master data information A1 116a. Further details regarding an approach that employs map construction based upon a query parameter, are provided later below in connection with at least FIGS. 22A-30T.

Figure 2:
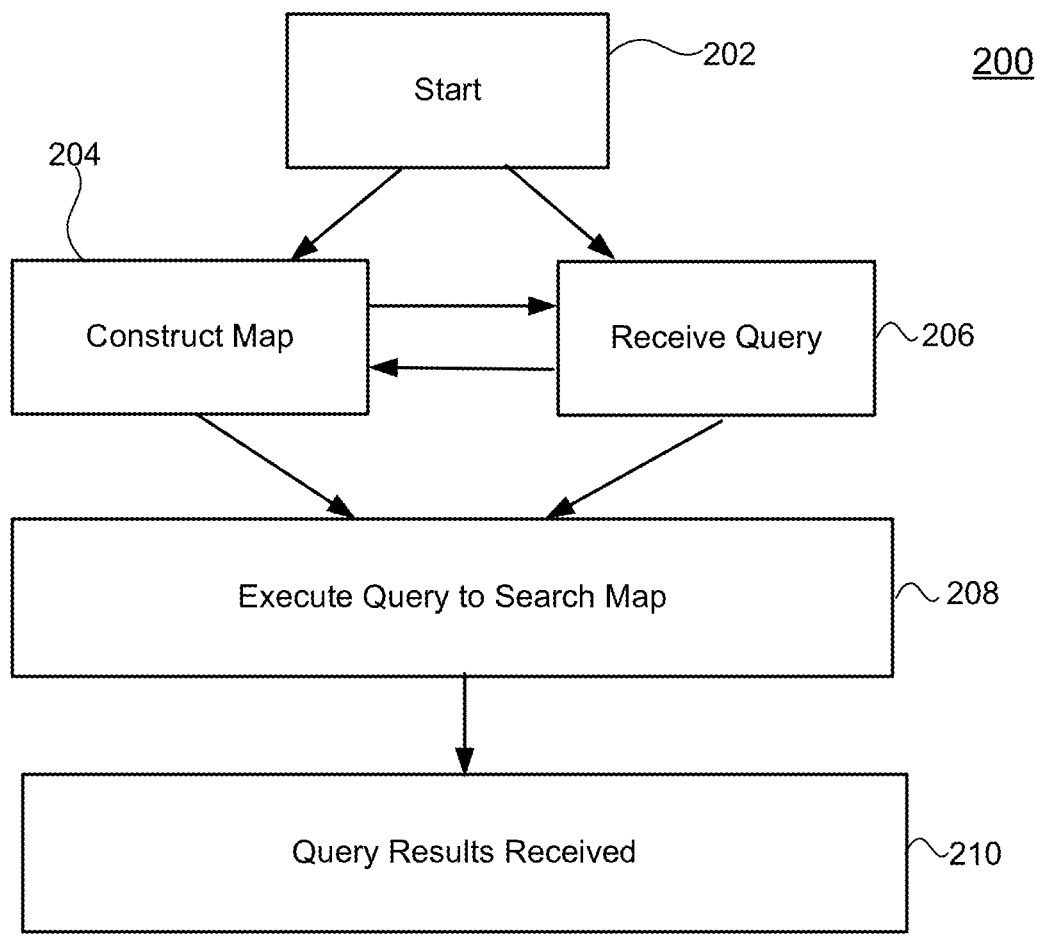
FIG. 2 shows a simplified flow diagram of a method according to an embodiment.

FIG. 2 is a flow diagram of a method 200 according to an embodiment. At 202, the method starts and proceeds either to map construction 204, or to receipt of a query 206 from a user. Either way, the method continues to the next phase (e.g., from map construction to query receipt, or from query receipt to map construction).

At 208, the query is executed to search the map. At 210 results returned by execution of the query to search the map, are received. Ultimately, those query results are communicated back to the user who originally posed the query.

Further details regarding data mapping and querying according to embodiments, are now provided in connection with the following examples.

EXAMPLES

One possible commercial application for certain embodiments, could be to provide access by a natural person to his or her private information that is stored in a landscape of systems. Such a right of access is now afforded by the European Union's recently-enacted General Data Privacy Regulation (GDPR).

For a company such as SAP SE, providing such privacy information might involve determining all (digital) representations of a data subject (individual)—whether the data representations are a business partner, a customer, or a vendor, etc. As part of this task, linkages are determined to construct a map and followed up with gathering data related to the individual natural person.

As part of master data management, it is noted that master data entity duplicates may be present within the system landscape. Possible reasons for this duplication can be, e.g., transactions such as mergers and acquisitions, systems that are working in parallel, and different varieties of systems (e.g., test, development, production).

Linking together of duplicates calls for an effective mapping technique as is described herein. Thus, an exemplary embodiment is now described.

As a summary of the instant example, a concept producing uniqueness for ambiguous identifiers (IDs) is provided below. Data leveraged by ID mapping technologies facilitate a holistic mapping approach. A formal notation is introduced to represent mapping information as well as parts thereof. Inference is used to gain advantage of explicit mapping information. Furthermore, the aspect of mapping between different master data entity types is covered below. The influence of the entry point for mapping and bi-directional mapping information is then described. Lastly, a concept to deal with partial mapping information and an optimized query mechanism are explained.

There are different sorts of master data entities. Examples are customers, suppliers, employees. A certain sort of master data entity is referred to as master data entity type.

A master data entity has an identifier (ID). Examples are the customer number, supplier number, employee and personnel number. Using an ID, it is easier to refer to a certain master data entity. For technical systems, the ID may be the reference to deal with master data.

The uniqueness of IDs can be distinguished into the following levels:

Database table

Application/System

System Landscape

Universe

Looking at database level, master data entities are stored in a database table. The ID most often is used as primary key (or part of the primary key) of the database table. Thus, a single ID is unique within this database table. This constraint in typically enforced by the database management system (DBMS).

In FIG. 3A, the example Database table CUSTOMER has primary key customer number and some more table columns like pre- and surname. There can be only one table entry having customer number 4711 in database table CUSTOMER. The customer number is the ID which is unique within database table CUSTOMER.

Taking the database table for suppliers (FIG. 3B) into account, the ID (supplier number for table SUPPLIER) is still unique within both tables. However, the ID is not unique considering both tables (together).

In the example there are two master data entities using the ID 4711 (Paul Yee in the table of FIG. 3A and X Ltd. In the table of FIG. 3B). Thus, the ID is ambiguous.

Turning now to look at the application/systems level, mechanisms to overcome the ambiguity in the database layer may exist. An example could be to use a central number/ID assignment. Using such a mechanism, uniqueness may be conferred upon multiple or even all database tables within a single database management system (DBMS).

However, considering multiple systems even this approach still results in ambiguity. For example, consider two systems: $S_1$ and $S_2$. In both systems there are customers and suppliers—shown in FIGS. 3C and 3D respectively.

Here, the following IDs are ambiguous:

4711:
used in system $S_1$ to reference a customer (customer number of Paul Yee)
used in system $S_2$ to reference a customer (customer number of Sam Miller)

4712:
used in system $S_1$ to reference a customer (customer number of Chris Chen)
used in system $S_2$ to reference a supplier (supplier number of Go Corp.)

5164:
used in system $S_1$ to reference a supplier (supplier number of X Ltd.)
used in system $S_2$ to reference a supplier (supplier number of Lucky Ltd.)

8150:
used in system $S_1$ to reference a supplier (supplier number of A Corp.)
used in system $S_2$ to reference a customer (customer number of Don Balmer)

Even though all IDs are unique within a single system, they are all are ambiguous considering both systems $S_1$ and $S_2$.

Looking now at the system landscape level, again there may be mechanisms to overcome the ambiguity on system landscape level. One example could be by a central number assignment on landscape level. Such an approach would lead to unique IDs within a system landscape.

However, even with an approach to ensure ID uniqueness within a system landscape, there might be ambiguities considering two or more system landscapes. Considering the complex system landscapes of enterprises, reasons such as security or regional aspects, may result in the separation of systems into multiple landscapes.

Turning now to look at possible universal approaches, one solution to overcome ambiguity can be the usage of the so called universally unique identifier (UUID). Such UUIDs are always unique as the (still existing) probability of ambiguity is so small that it could be neglected. In addition, the creation of UUIDs can be decentralized—i.e., whenever a new UUID is required each system or database can create it on its own.

The persistent usage of UUIDs can solve many IT challenges regarding uniqueness. However, their usage in business processes involving individuals, can be cumbersome. One example of a UUID is:

1ee754a4-c1e5-4c8d-9024-d373646dabf3

The structure and length of UUIDs can make them hard to remember by people, and their usage may be error-prone. Accordingly, usage of ambiguous IDs remains an issue for at least human-touched business processes.

An exemplary approach for achieving a suitable level of uniqueness using ambiguous IDs (without using and/or introducing UUIDs), is now explained.

Given an ID that is ambiguous considering two or more database tables, the master data entity type is used to produce uniqueness on system level. Instead of simply writing the ID, the entity type is written in advance, separated with a colon (:).

The resulting notation is:
<master data entity type>:<ID>
where <master data entity type> and <ID> are placeholders for the respective values.

An example is now given. In FIG. 4A, the ID customer: 4711 (Paul Yee) is not equal to supplier:4711 (X Ltd.) in FIG. 4B, even though the customer number and supplier number are the same. Thus, the IDs customer:4711, and supplier:4711 are unique within the system (considering both tables together).

According to embodiments, uniqueness on system landscape level is conferred by adding a system identifier. The notation is enhanced as follows:

<system identifier>:<master data entity type>:<ID>.

Examples are given in FIGS. 4C and 4D.

Accordingly, the following unique IDs are available for this example:

$S_1$:customer:4711
$S_1$:customer:4712
$S_1$:supplier:5164
$S_1$:supplier:8150
$S_2$:customer:4711
$S_2$:customer:8150
$S_2$:supplier:5164
$S_2$:supplier:4712

The issue of having a master data entity versus a unique entity (such as a natural person, corporation, or juristical person), is now considered. A natural person exists only once and is per se unique. There are different techniques for referencing a natural person. The most common one might be using a pre- and surname. However, few or even no techniques lead to (universally) unique identifiers. Most techniques lead to ambiguous identifiers (e.g. pre- and surname).

Figure 5:
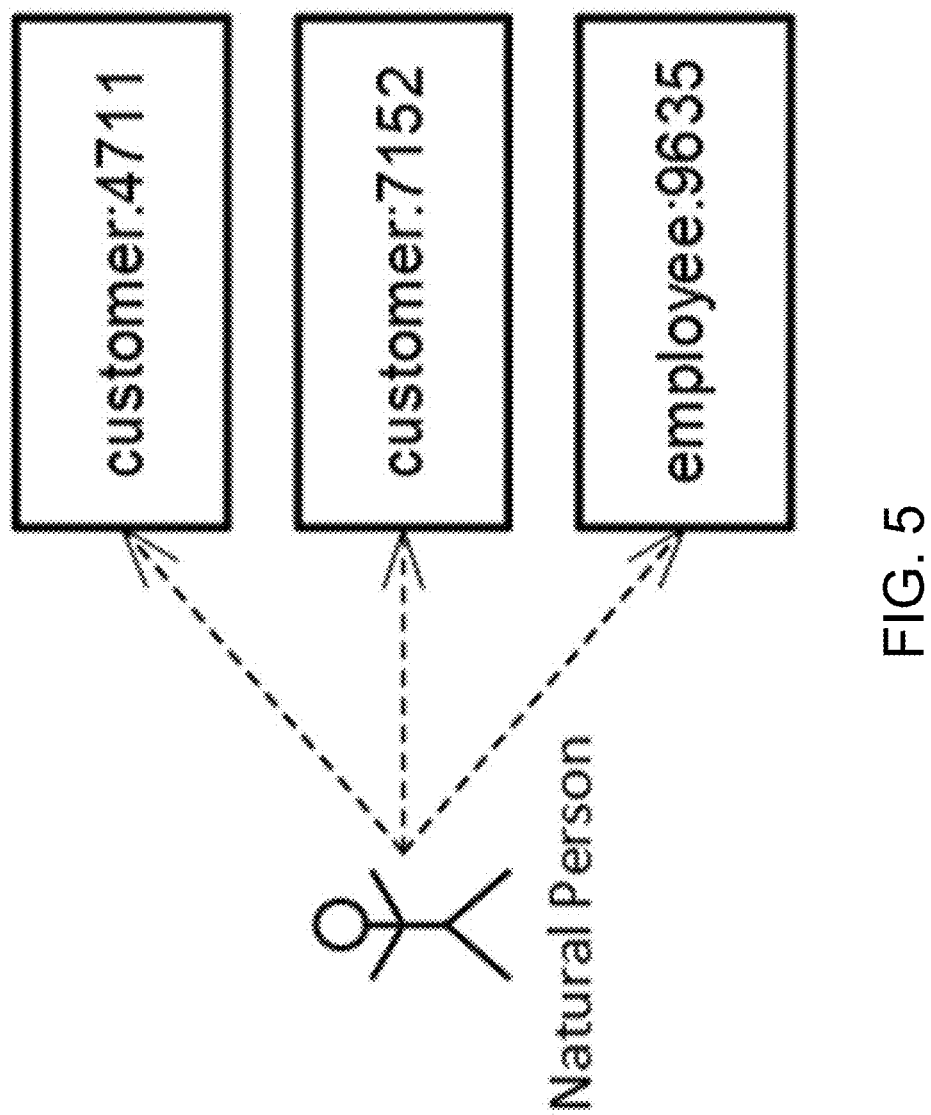
FIG. 5 is a simplified view of a natural person with multiple representations.

There might be multiple representations for a single natural person within one software system or even within one application. These might get created as duplicates by accident or for other reasons. FIG. 5 is a simplified view of a natural person with multiple representations.

ID mapping technologies may be used to express that a certain ID is linked or equal to another ID. For example, one could express that:

customer:4711 is equal to customer:7152.

IDs may only be mapped considering the same master data entity type. However, there is no need to retain this restriction. For example, in the use case of information retrieval for a natural person, all IDs linked to that person are relevant independent from the master data entity type.

Nevertheless, any ID mapping technology can be used to assemble such an overall/holistic mapping information record for a natural person. For example, the Customer Relationship Management (CRM) middleware available from SAP SE, comprises mapping information for master data entities SAP business partners and customers across systems. The SAP Customer-Vendor-Integration (CVI) comprises mapping information for customers, vendors, and SAP business partners within a system.

A structure for ID mapping information is now described. ID mapping information may not directly comprise a source and target information. Rather there is some configuration information that states mapping targets, whereas the mapping source is the current system. For example:

System $S_1$
  ID mapping technology $M_1$
    customer:1 maps to customer:2
    customer:3 maps to customer:4
  ID mapping technology M2
    partner:5 maps to customer:6
    partner:7 maps to customer:8
  Mapping target: $S_2$
System $S_2$
  ID mapping technology $M_1$
    customer:9 maps to customer:10
    customer:11 maps to customer:12

ID mapping technology $M_3$
   customer:13 maps to customer:14
   customer:15 maps to customer:16
  Mapping target: $S_3$ There are deviations from this approach, e.g. providing for multiple target systems.

In the course document mapping according to embodiments, information is represented having an explicit source and target information. In addition the information about the origin for each mapping record as well as via which destination the target system can be reached is stored.

Specifically, in the instant example a mapping record includes following information.

Source system's own given ID
  The identifier the system from which the mapping record originates gives itself. This ID is fixed at any time. It needs to be unique upon all systems in a mapping scenario.

Source master data entity type
  Master data entity type used in the system from which the mapping record originates (source) for the master data entity in question.

Source master data entity ID
  Master data entity ID used in the source system for the master data entity in question.

Target destination:
  The name of the destination (a technical connection) via which the mapping record's target system (target) can be reached. The destination name which states the destination to connect from the source system to the target system, i.e. the system the mapped master data entity exists in. Important: this name is most likely only be useable within the current system. It might not be useable to identify the connection from outside the system.

Target system's own given ID
  The identifyer the target system gives itself. This ID is fixed at any time. It needs to be unique upon all systems in a mapping scenario.

Target master data entity type
  Master data entity type used in the system target system for the master data entity in question.

Target master data entity ID
  Master data entity ID used in the target system for the master data entity in question.

Name of the destination the mapping record was received with
  When mapping information is shared with/transferred to other systems this destination name states the destination via which the mapping record was received (in the receiving system). In the system where the mapping record was originally created this name is not used and rather blank.

Figure 6:
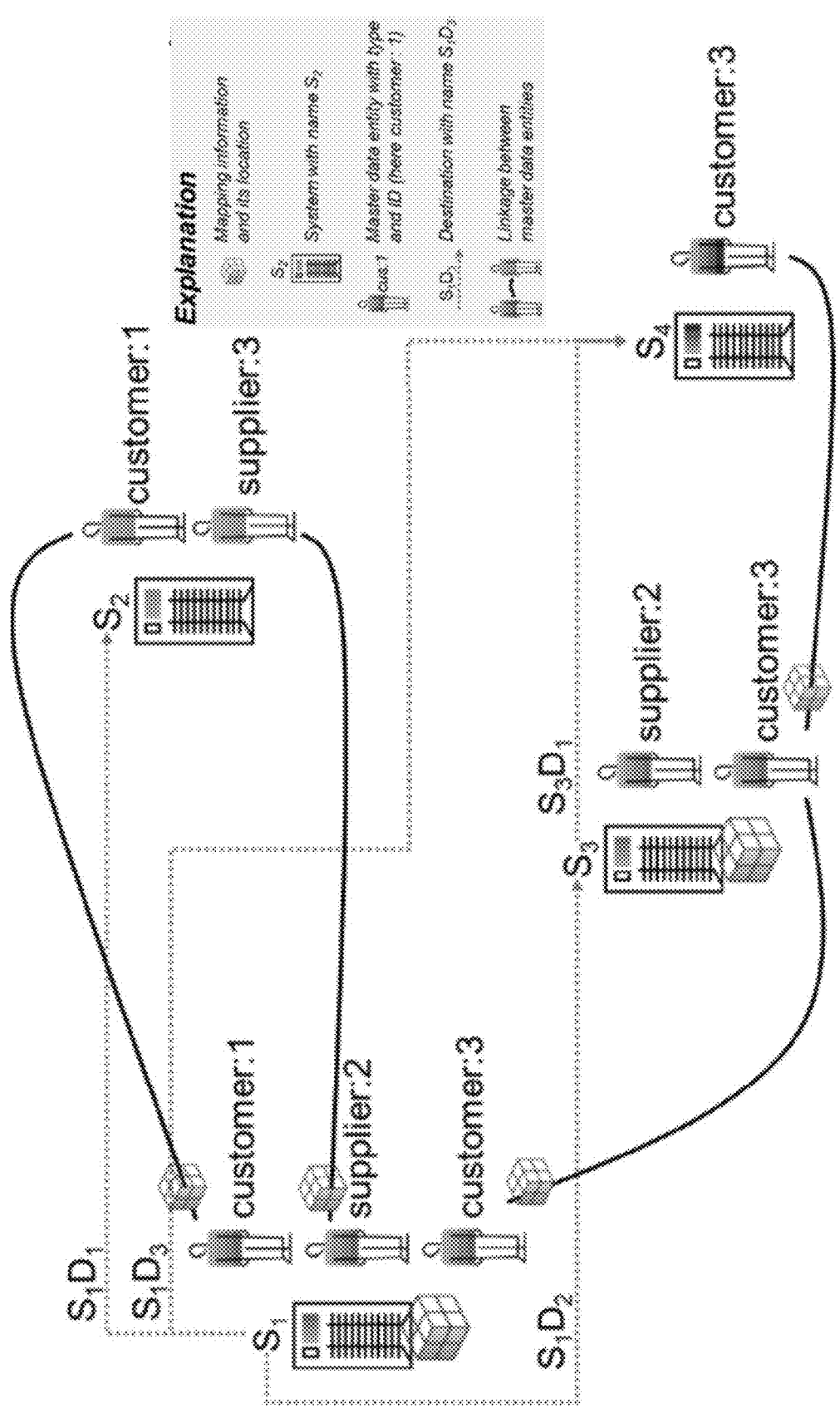
FIG. 6 shows an example of a system to be mapped.

An example for ID mapping information is now given in connection with FIG. 6. There are four systems in the system landscape, $S_1$, $S_2$, $S_3$ and $S_4$. Master data mapping information is available in systems $S_1$ and $S_3$. There are three master data entities is system $S_1$, two in system $S_2$, two in system $S_3$ and one in system $S_4$. System $S_1$ has a destination to system $S_2$ with name $S_1D_1$. System $S_1$ has further destinations to system $S_3$ with name $S_1D_2$ and to system $S_4$ with name $S_1D_3$. System $S_3$ has a destination to system $S_4$ with name $S_3D_1$.

Looking into the mapping information available in systems $S_1$ and $S_2$ shows the FIGS. 7A and 7B.

Mapping information modelling notation is now discussed. Representing mapping information in tables (like FIGS. 7A-B) as well as system landscape data in non-standardized figures (like FIG. 6) may be difficult and error-prone.

Accordingly, this example introduces the following notation to standardize mapping information and system landscape data.

A piece of mapping information is represented by a rectangular shape as shown in FIG. 8A. The piece of mapping information includes:
  the system's own given ID (system)
  the master data entity type (entity type)
  the master data entity ID (ID).

As shown in FIG. 8B, destination information is represented by an oval shape. Such destination information includes:
  the system's own given ID (system) and
  the destination name (destination).

Thus looking at the table of FIG. 7A, the entry #1 would be noted as shown in FIG. 8C.

The combination of FIG. 8C is called a term. The fact that there is a connection between two systems via a destination (if there is a master data entity mapping or not) is noted by keeping the entity type and ID blank, as shown in FIG. 8D.

Figure 9:
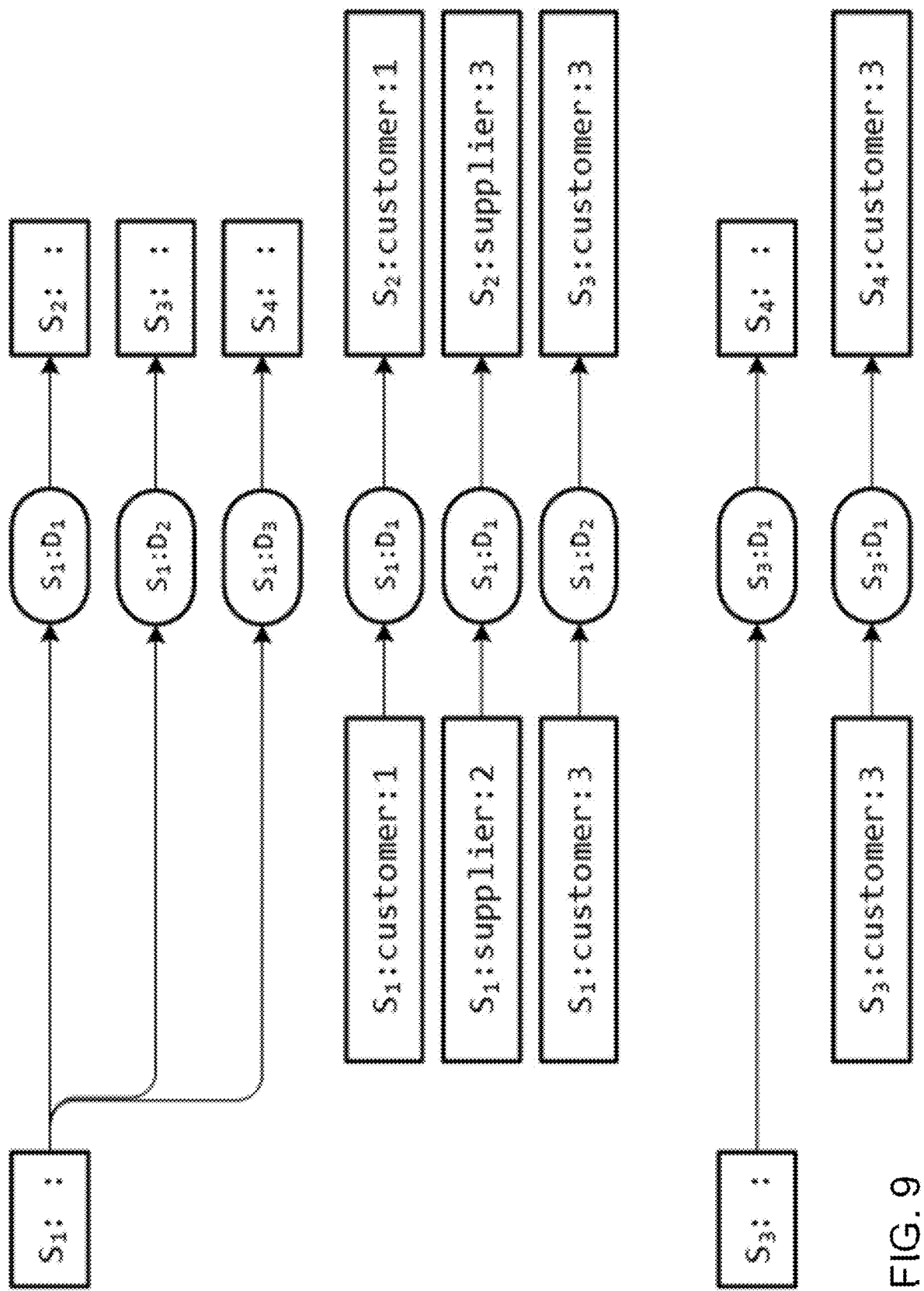
FIG. 9 shows a graphical depiction of a map.

The system landscape configuration of FIG. 6, and the mapping information of the tables of FIGS. 7A and 7B can be noted as shown in FIG. 9.

Looking at the first "row" of FIG. 9, it is read as system $S_1$ has a connection to system $S_2$ via destination $S_1D_1$. The first three rows imply that system $S_1$ has a connection to systems $S_2$ via destination $S_1D_1$, $S_3$ via destination $S_1D_2$ and $S_4$ via destination $S_1D_3$ as depicted in FIG. 6.

The next three rows of FIG. 9 represent the information of the table of FIG. 7A. The second last row represents the connection between system $S_3$ and system $S_4$ via destination $S_3D_1$ as depicted in FIG. 6. The last row represents the information of the table of FIG. 7B.

The inference of ID mapping information is now discussed. Taking the example of FIGS. 6 and 7A-7B, the mapping information available in systems $S_1$ and $S_3$ can be combined.

It should be noted that there is no information available at system $S_1$, which indicates that $S_1$:customer:3 is linked to $S_4$:customer:3. However, from the perspective of system S this can be inferred when taking into account the mapping information available in system $S_3$.

Therefore, this mapping information is transferred to system $S_1$. This results in the mapping information at system $S_1$ as shown in the table of FIG. 10.

Figure 11:
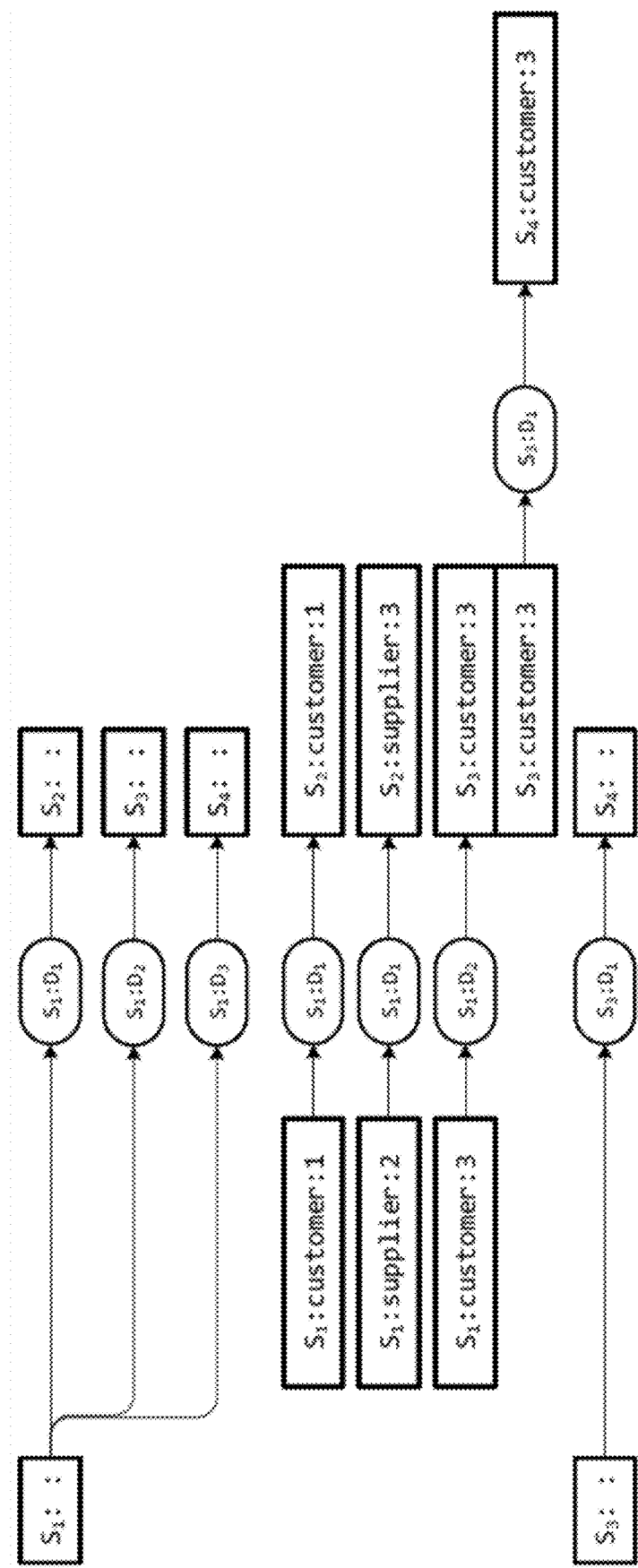
FIG. 11 shows a different graphical depiction of a map.

Here, the column 'received via destination', has value $S_1D_2$ to state that entry #4 was received from another system via the destination with name $S_1D_2$. When refining FIG. 9, this fact is expressed by rearranging the shapes as shown in FIG. 11.

Figure 12:
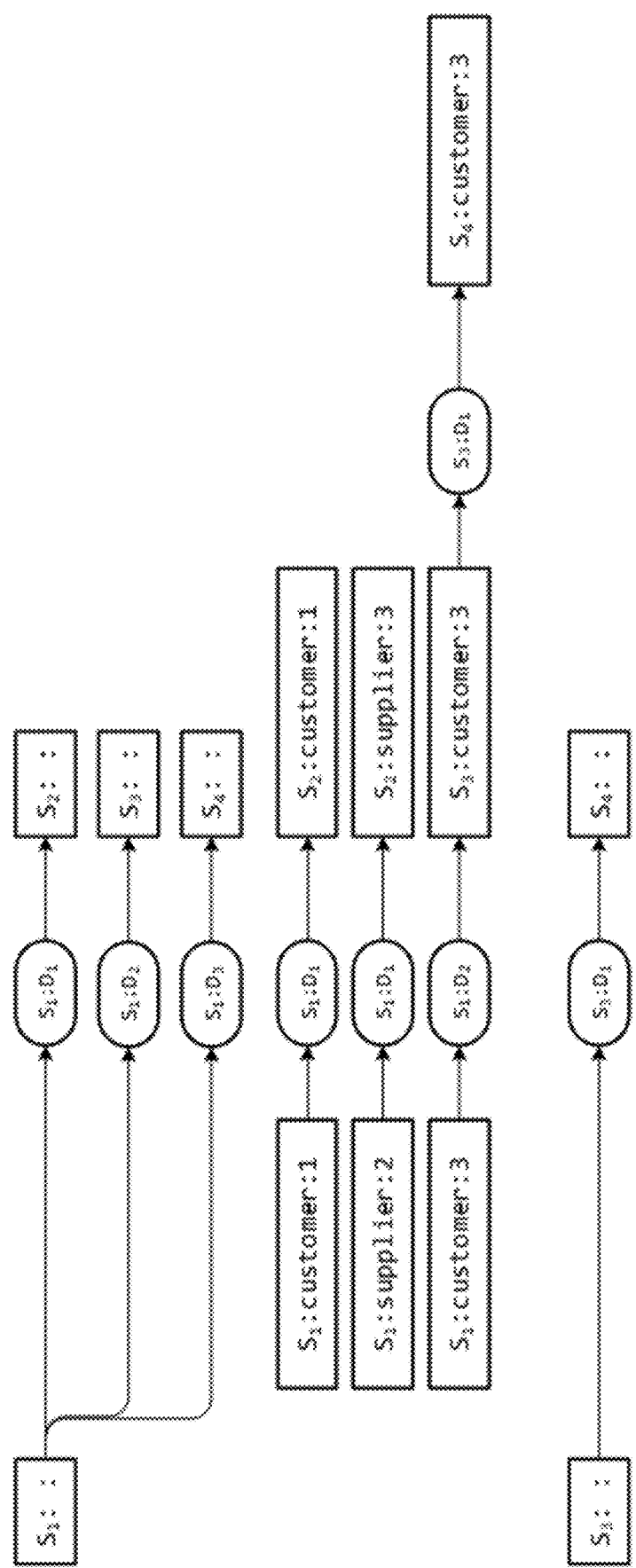
FIG. 12 shows another graphical depiction of a map.

Here, one term has just been moved so that identical pieces of information (rectangles) are joined. We define that identical pieces of information are collated (no duplicates). This is shown in FIG. 12.

Figure 13:
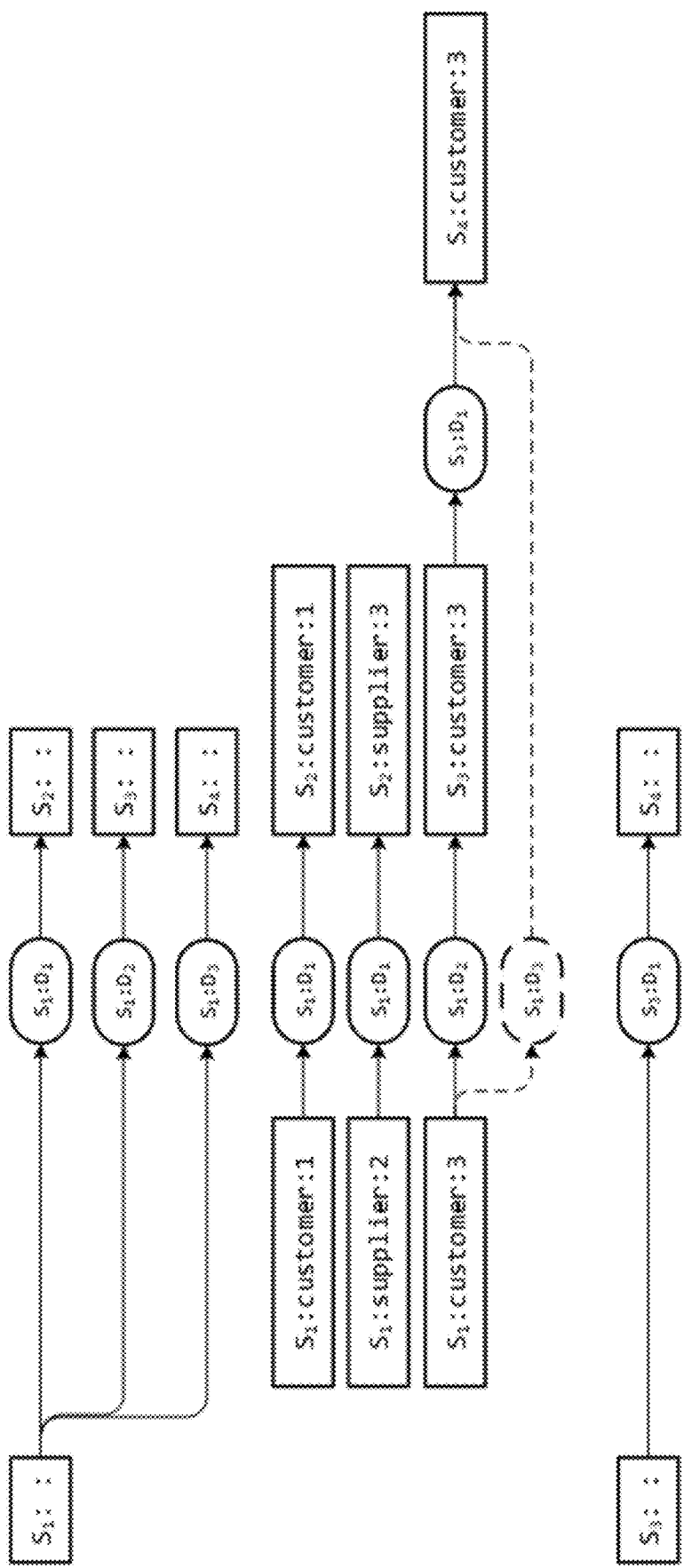
FIG. 13 is a graphical map that makes inferred mapping information explicit.

In addition, information on connections between systems is used to infer implicit mapping information pieces. FIG. 13 makes inferred mapping information explicit (dashed line).

Figure 14:
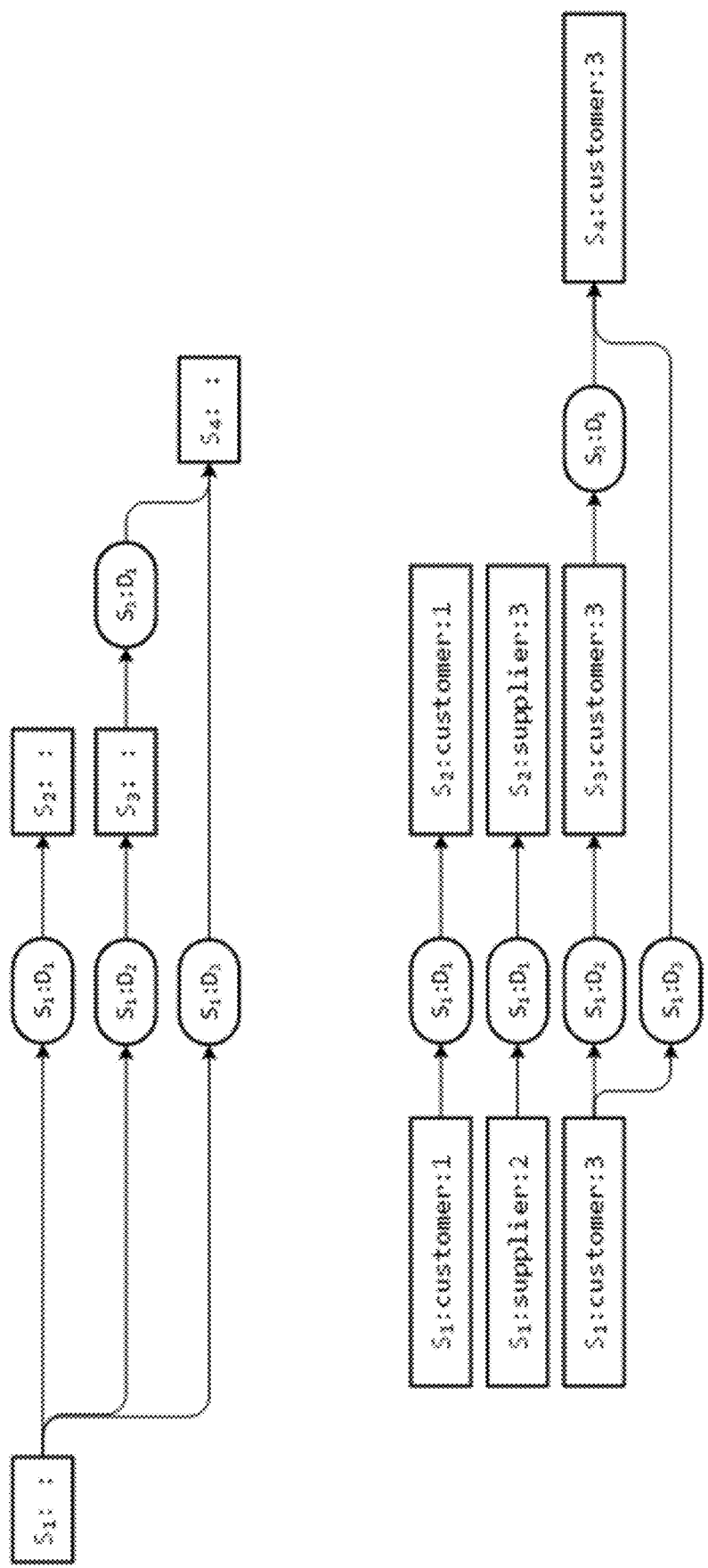
FIG. 14 shows a graphical depiction of another map.

The information on systems and their connections can be transformed as well, as shown in FIG. 14.

This inferred mapping information can be represented in a plain table as shown in FIG. 15.

The use of inferred explicit mapping information may confer benefits. In particular, turning implicit mapping information into explicit mapping information via inference offers several advantages:

Performance when consuming mapping information:
Applications and processes use explicit information (independent if it is mapping information or other information). Implicit information is transformed to explicit information before being able to use it. Having made all mapping information explicit, increases the performance of consumers of mapping information.

Alternative mapping paths create consumers for optimized and/or alternative process flows:
Cost optimization:
There might be different costs for using a certain destination. For example, the costs for data transferred through destination $S_1D_2$ and $S_3D_1$ might be higher than using $S_1D_3$. A direct communication from system $S_1$ to system $S_4$ for processes concerning customer:3 might thus be cheaper. These costs might be measured in €/$/ . . . or seconds/ms/ . . . or even something else.
Resilience and reliability:
Whenever there is a break-down of destination $S_1D_2$ using the inferred mapping information processes might alternatively use destination $S_1D_3$ to keep a process running.

Certain embodiments may provide for mapping between different master data entity types and IDs. In particular, there is no need to restrict mapping information to mappings between equal master data entity types and IDs.

For example, the SAP Customer-Vendor-Integration (CVI) consists of mapping information between SAP business partners and customers as well as vendors within a system. Using the same ID for identical master data entities in all systems may not be possible or desired from an operational side.

Figure 16:
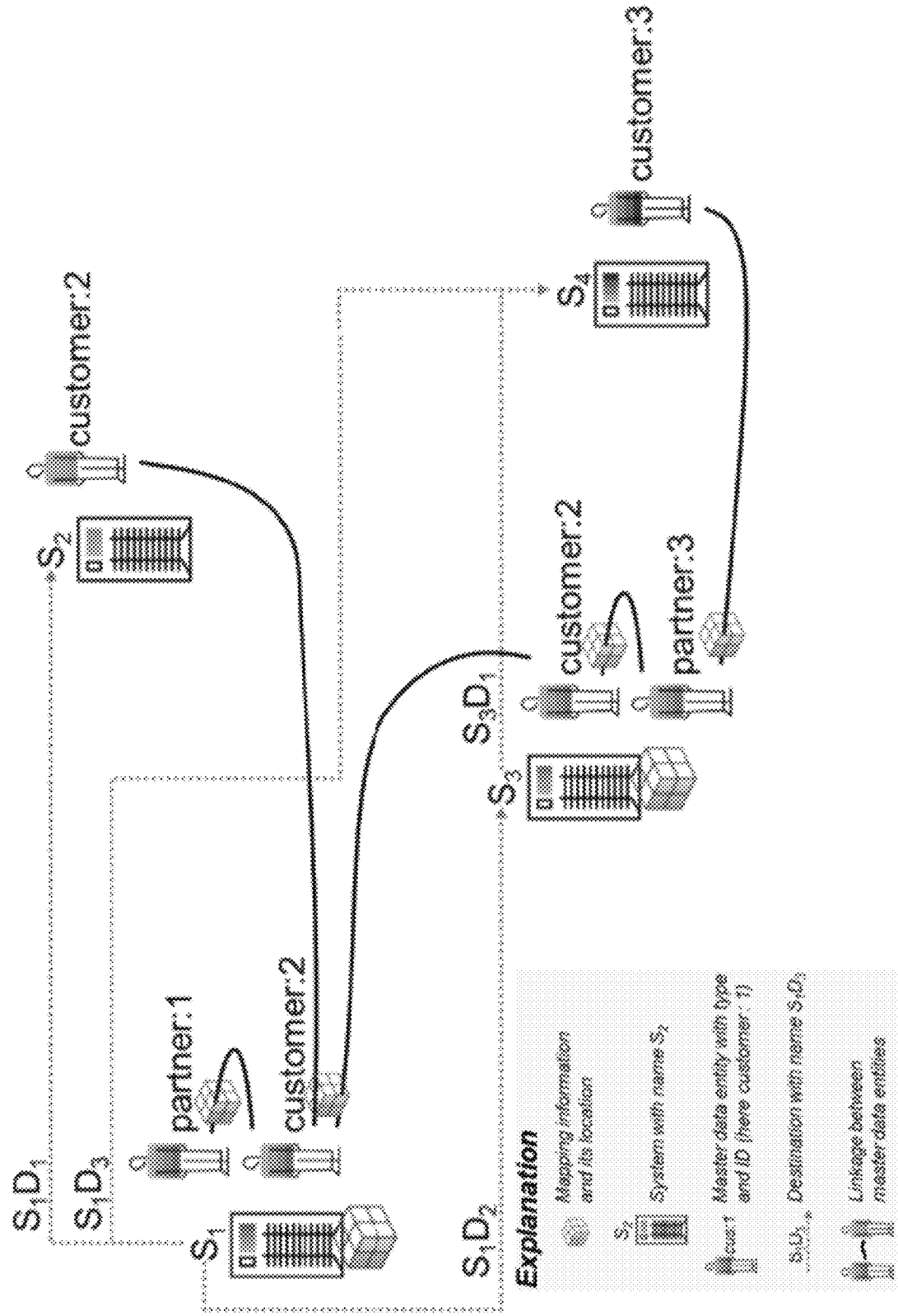
FIG. 16 shows an example of a system to be mapped.

Consider the example illustrated in FIG. 16. Here, there are four systems in the system landscape: $S_1$, $S_2$, $S_3$ and $S_4$.

Master data mapping information is available in systems $S_1$ and $S_3$. There are two master data entities is system $S_1$, one in system $S_2$, two in system $S_3$ and one in system $S_4$.

System $S_1$ has a destination to system $S_2$ with name $S_1D_1$. System $S_1$ has further destinations to system $S_3$ with name $S_1D_2$ and to system $S_4$ with name $S_1D_3$. System $S_3$ has a destination to system $S_4$ with name $S_3D_1$.

Looking into the mapping information available in systems $S_1$ and $S_3$ shows the information of the tables of FIGS. 17A-B.

In the mapping information directly available in system $S_1$ we find: Master data entity $S_1$:partner:1 maps to $S_1$:customer:2 (in the same system, therefore target destination is "NONE"). Master data entity $S_1$:customer:2 maps to $S_2$:customer:2 as well as to $S_3$:customer:2.

In the mapping information directly available in system $S_3$ we find: Master data entity $S_3$:customer:2 maps to $S_3$:partner:2 (in the same system, therefore target destination is "NONE"). Master data entity $S_3$:partner:3 maps to $S_4$:customer:3.

Figure 18:
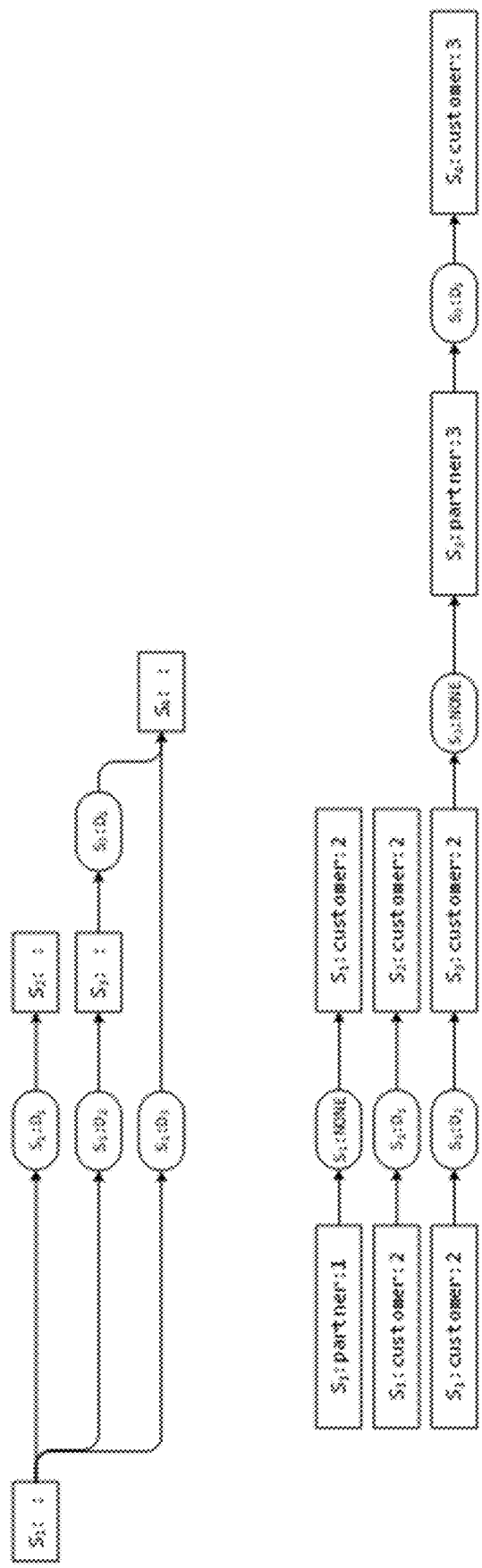
FIG. 18 is a graphical depiction of mapping information.

The mapping information is depicted also in FIG. 18.

Figure 19:
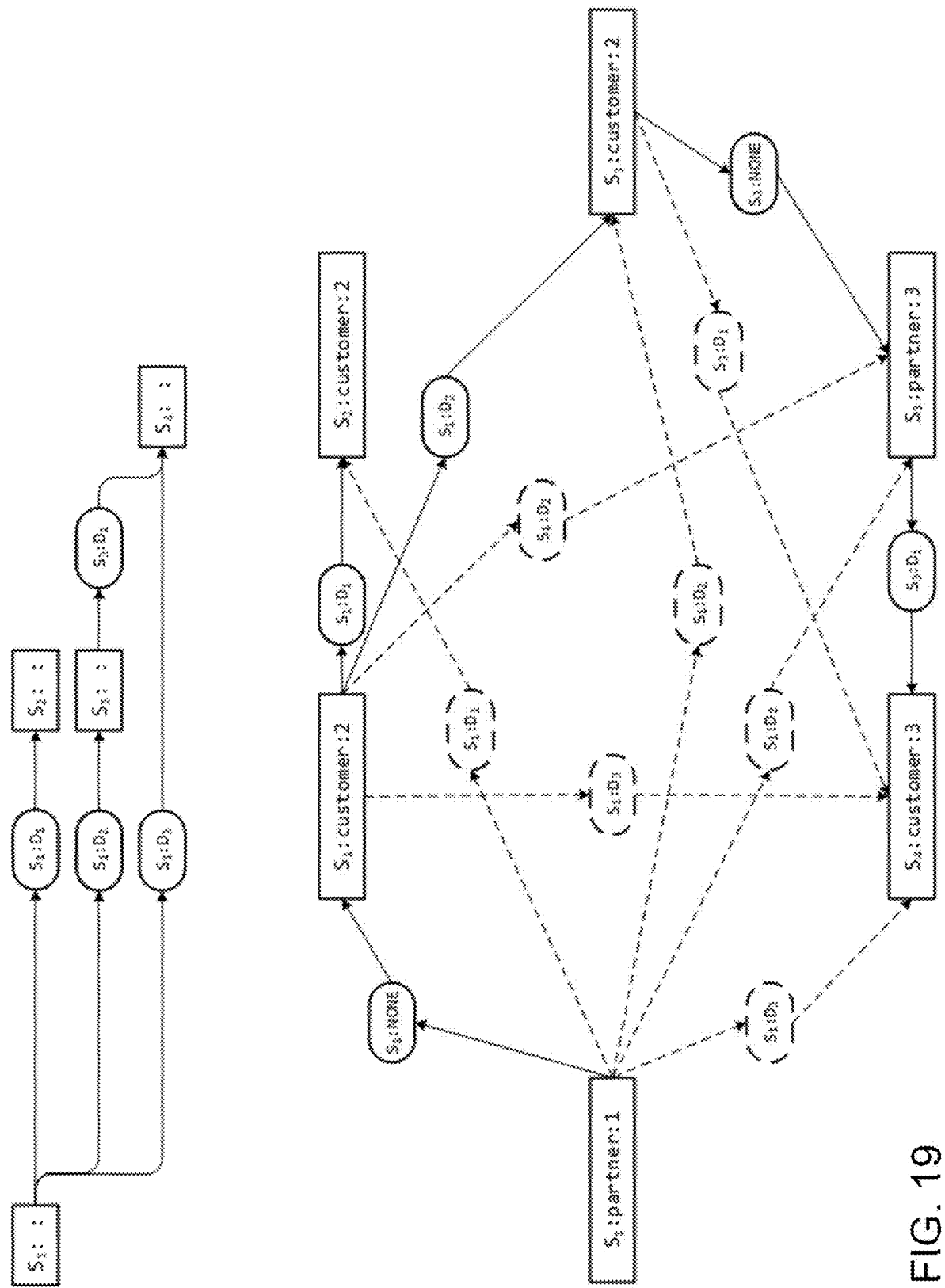
FIG. 19 is a graphical depiction of a map leveraged based upon inference.

Via inference, the following mapping information is leveraged, as shown in the dashed shapes of FIG. 19.

Mapping between different master data entity types is possible. In this example actually most master data entities are linked to each other. In other words, all master data entities are representations of the same natural person.

An entry point for mapping information and bi-directional mapping information, is now discussed. The portion of actually available mapping information depends on the system which serves as entry point for querying mapping information.

A superior viewer who is omniscient could gain the knowledge/mapping information of the elements in FIG. 19.

Let's check for each system in the example, for which mapping information would be available if querying is started at a particular system.

Figure 20:
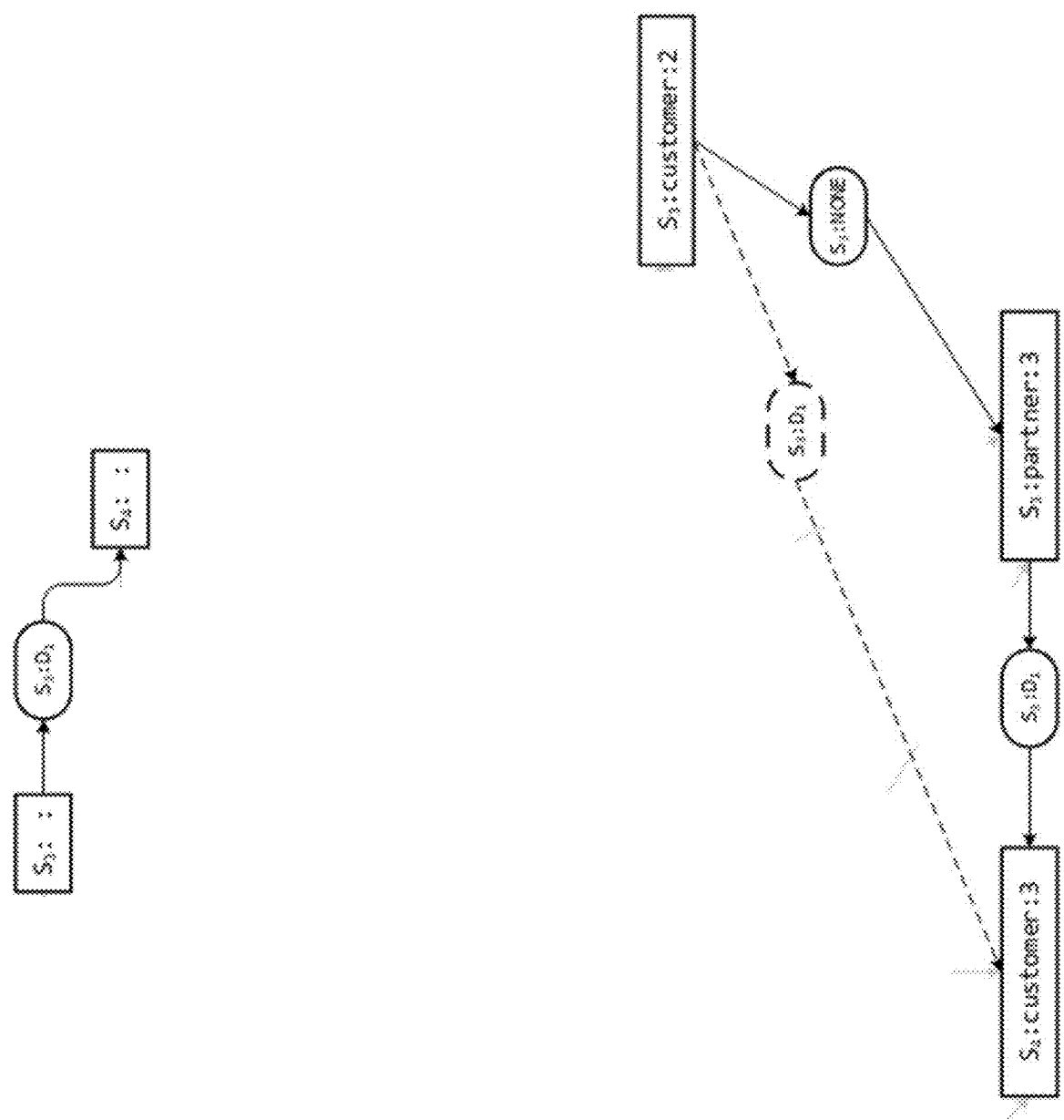
FIGS. 20-21 show different map graphical depictions.

The start system for querying mapping information is $S_1$.
The mapping information shown in FIG. 19 would be gathered (=all mapping information that could theoretically be gathered).
The start system for querying mapping information is $S_2$.
Only $S_2$:customer:2 would be gathered.
The start system for querying mapping information is $S_3$.
FIG. 20 shows the mapping information that would be gathered.
The start system for querying mapping information is $S_4$.
Only $S_4$:customer:3 would be gathered.

The four cases show that the gathered mapping information depends on which system is used to start the query. Another reason for this is that the connections between systems are directed and not bi-directional.

At least the following are various reasons why connections between systems are directed:
for security reasons (restrict access)
no operational need for bi-directional connections
costs for operation and maintenance.

Figure 21:
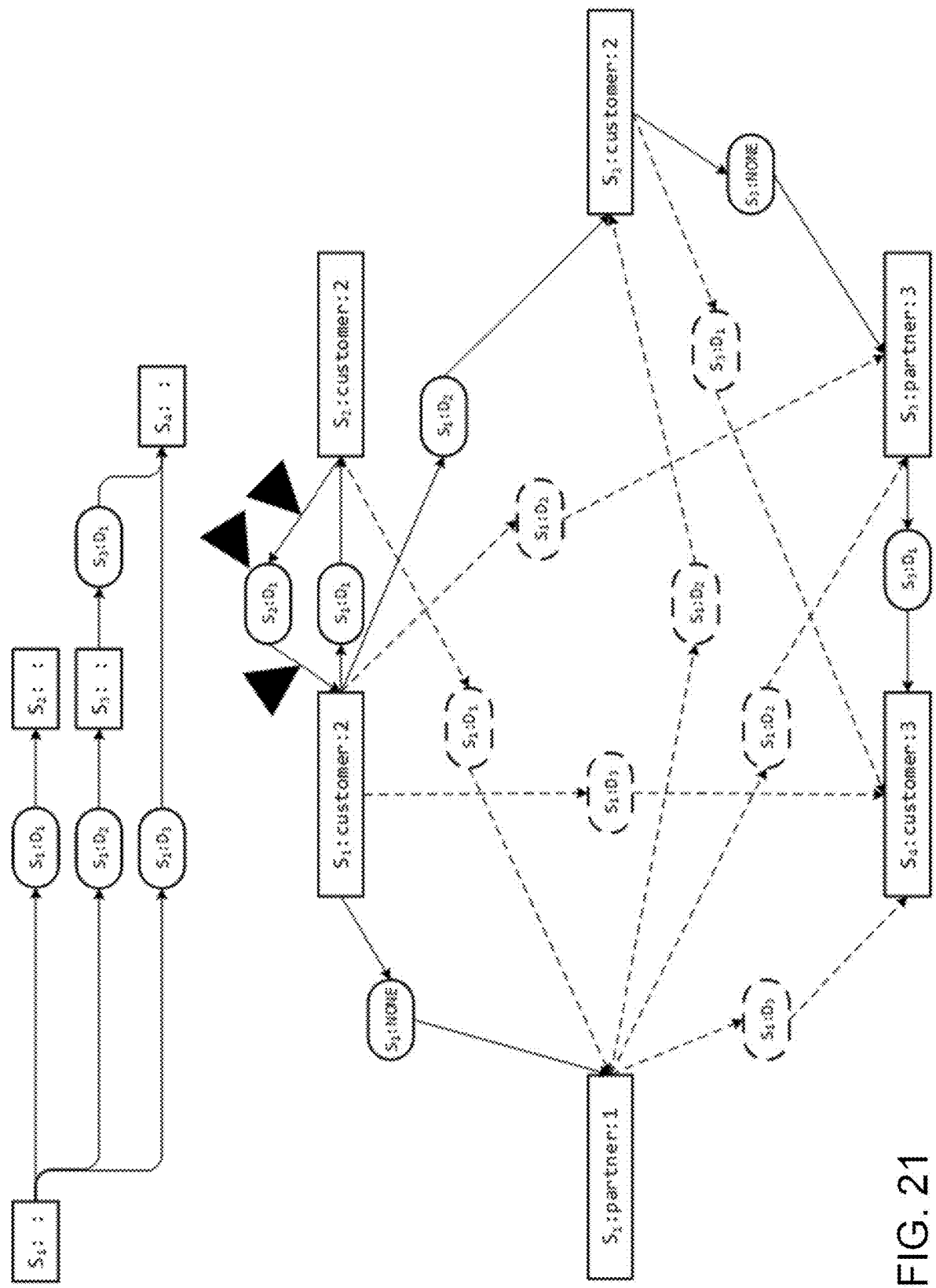

However, bi-directional connections which can also be represented by the existence of a second connection with the opposite direction, can increase the mapping information that could possibly be gathered. Let's take the already used example and adjust the system landscape so that there is another connection sourcing from system $S_2$, targeting system $S_1$. This adjustment is depicted in FIG. 21.

Compared to just knowing $S_2$:customer:2, instead of no mapping information, all theoretically available mapping information is gathered. Compared to FIG. 19, an additional connection via destination $S_2D_1$ (shown with big, black triangles) is available.

This leads so some further direction changes (e.g. between $S_1$:customer:2, and $S_1$:partner:1 via destination $S_1$:NONE). But, there is no loss of mapping information.

It can be summarized that additional/bi-directional connections may increase the amount of mapping information that could be gathered. Such connections are supported as well as intended by the approach according embodiments.

Partial mapping information and an optimized query mechanism are now discussed. Considering systems and system landscapes with numerous master data entities, querying all mapping information records of all master data entities from each system might be difficult, due, e.g., to the amount of to be transferred and stored data, communication costs.

The following (implicit) query mechanism may be used:
Step 1: Gather all mapping information (of all mapping technologies) for all master data entities in the current system.
Step 2: Gather information on all connected systems in the current system.
Step 3: Trigger steps 1 to 5 in all systems gathered in step 2.
Step 4: Receive mapping information from all systems that have been triggered in step 3.

Step 5: Consolidate mapping information of step 4 and pass this it to the calling system (does not apply for the initial system).

This approach can be called a snowball-approach. It may offer one or more of the following drawbacks.

- The amount of data gathered in step 1 can be large. This impacts further steps and/or might result in an unwanted resource consumption in the current and subsequent systems.
- Calling to each system that is connected to a certain system (step 2) may result in numerous cross-system calls and additional transferring a large volume amount of data. These are typically resource intensive (e.g., processing time, communication costs). Due to the fact that the subsequent (connected) system do the same for their connections, the amount of calls in the system landscape might reach a level affecting other business processes or triggering security alerts.
- Looking at the execution hierarchy of all steps in all systems, the amount of data received in step 4 increases depending on the hierarchy level. The higher a system is in the hierarchy, the more data it will receive. The most data is received in the system the process initially started at. It is unpredictable how much data that will be.
- Typically, for business cases not all mapping information of all master data entities is necessary. Only the mapping information of few or even only a single entity may be important.

In order to address such one or more such issues, the following boundary condition is defined. Only mapping information for a defined set of master data entities is considered (instead of all mapping information for all entities).

The querying approach is changed to be as shown in FIGS. 22A-C. The following abbreviations are used: (MI) =mapping information; (MDES)=master data entity set.

The introduced boundary condition limits the resource consumption as only relevant information is processed and transferred. However, the downside is that there is the chance to call systems twice or more times to assemble a holistic picture on the mapping.

Figure 23:
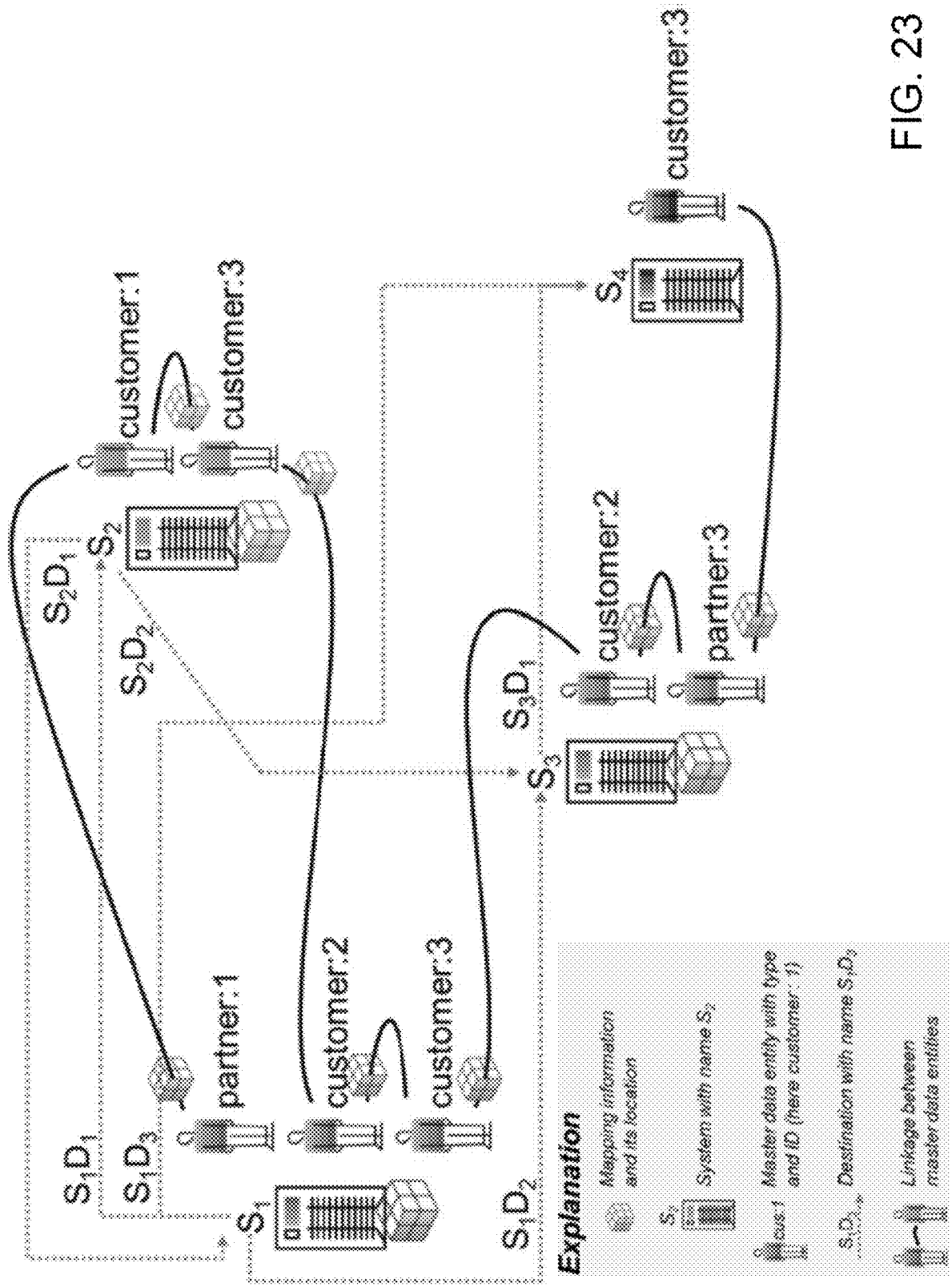
FIG. 23 shows an example of a specific query mechanism applied to a system.
Figure 24:
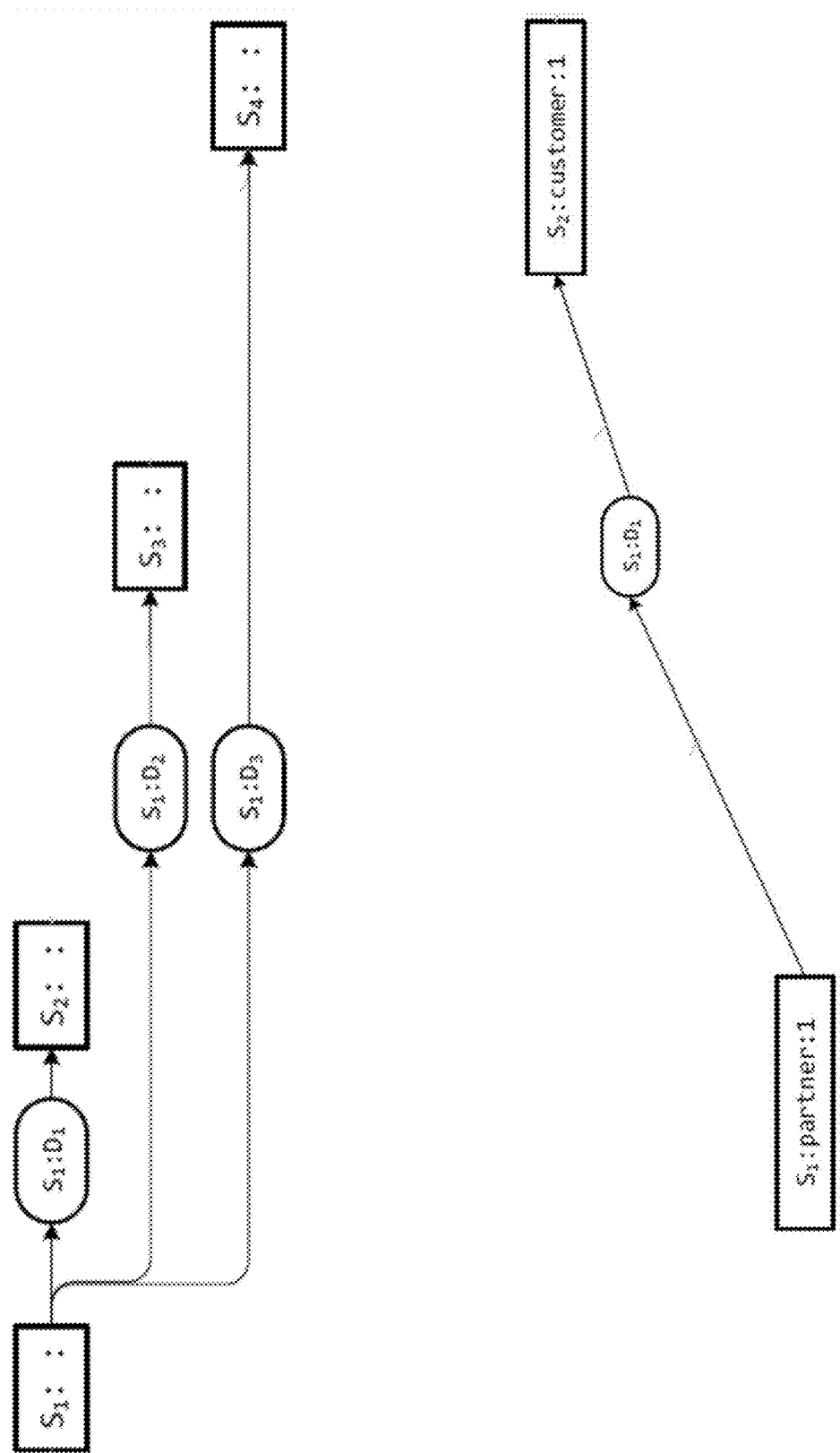
FIGS. 24-27 are graphical map depictions showing available information.

A specific example of the query mechanism of FIGS. 22A-C is now provided in connection with FIG. 23. There are four systems in the system landscape, $S_1$, $S_2$, $S_3$ and $S_4$.

Master data mapping information is available in systems $S_1$, $S_2$ and $S_3$. Three master data entities are in system $S_1$, two in system $S_2$, two in system $S_3$, and one in system $S_4$.

System $S_1$ has a destination to system $S_2$ with name $S_1D_1$. System $S_1$ has further destinations to system $S_3$ with name $S_1D_2$ and to system $S_4$ with name $S_1D_3$. System $S_2$ has a destination to system $S_1$ with name $S_2D_1$ and a destination to $S_3$ with name $S_2D_1$. System $S_3$ has a destination to system $S_4$ with name $S_3D_1$.

In some of the following figures, implicit mapping information is not made explicit for simplification purposes for ease of illustration. Otherwise, the figures would be crowded with shapes. Inference as described previously, can be applied.

Looking at FIG. 23, we can see that the linkages between master data entites has the structure of a snail, i.e. each master data entity is like a pearl on a string. Let's apply the querying approach of FIGS. 22A-C to that system landscape, starting the query in system S for master data entity $S_1$:partner:1.

The execution of step 1 reveals the mapping between $S_1$:partner:1 and $S_2$:customer:1 (but not the one between $S_1$:partner:1 and $S_1$:customer:2), resulting also in MDES$_2$. This is shown in the table of FIG. 30A.

Step 2 results in an empty set MDES$_3$ as the found master data entities reside in another system (not the current one). Accordingly, MDES$_4$ contains $S_2$:customer:1. This is shown in the table of FIG. 30B.

In step 3 no repetition is performed because MDES$_3$ is empty.

Steps 4 and 5 result in MDES$_5$ and MI$_2$ as shown in the table of FIG. 30C. This is also highlighted (in the lower part of the FIG. 24) and C1 as highlighted in the upper part of FIG. 24.

Step 6 just moves to the next step ($I_1$=all). In step 7 the steps 1 to 6 are triggered in system $S_2$.

Keep in mind we are at step 7 in system $S_1$, while we move on with step 1 in system $S_2$. The execution of step 1 reveals the mapping between $S_2$:customer:1 and $S_2$:customer:3. MDES$_2$ and MI$_1$ are filled accordingly. This is shown in the table of FIG. 30D.

Step 2 results in set MDES$_3$, as MDES$_2$ only contains entities that reside in the current system and an empty MDES$_4$. This is shown in the table of FIG. 30E.

Step 3 leads to a repetition because MDES$_3$ is not empty. Thus, we start over with step 1, whereas MDES$_1$ is set to contain all entries of MDES$_3$ (here only one entry). As result the mapping to $S_1$:customer:2 is revealed. This is shown in the table of FIG. 30F.

Step 2 results in an empty MDES$_3$' and a filled MDES$_4$'. This is shown in the table of FIG. 30G.

In step 3 no repetition is performed because MDES$_3$' is empty.

Step 4 results in the consolidation of MDES$_1$, MDES$_1$', MDES$_2$, MDES$_2$', MDES$_3$, MDES$_3$' MDES$_4$ and MDES$_4$' as well as MI$_1$ and MI$_1$'. Step 5 leverages the connection of system $S_2$. This is shown in the table of FIG. 30H.

Step 6 ends further processing and hands back the gathered information to system $S_1$ (due to I1='1-6').

Back in system $S_1$ the execution is continued at step 8. This is shown in the table of FIG. 30I.

Figure 25:
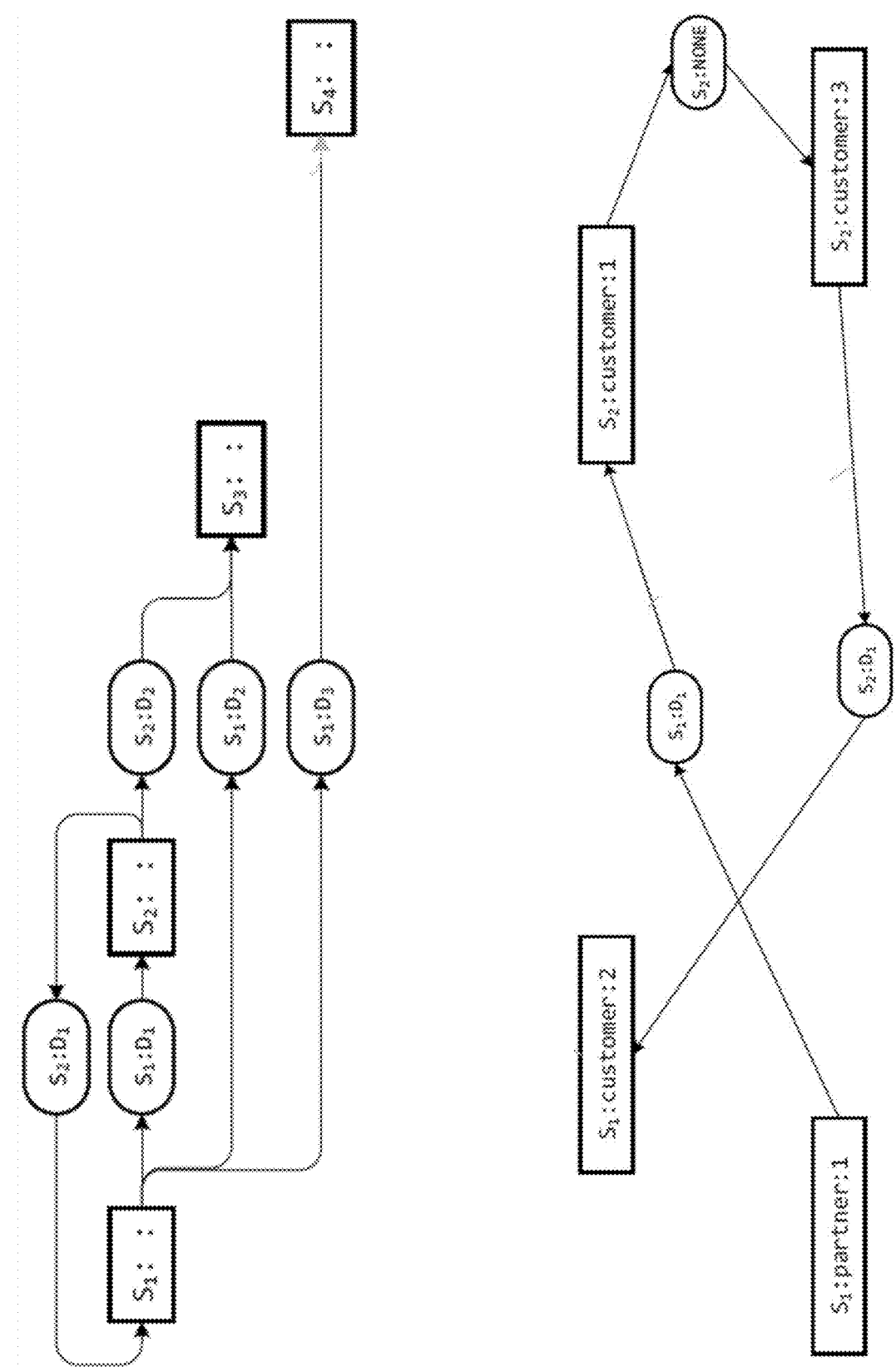
Figure 26:
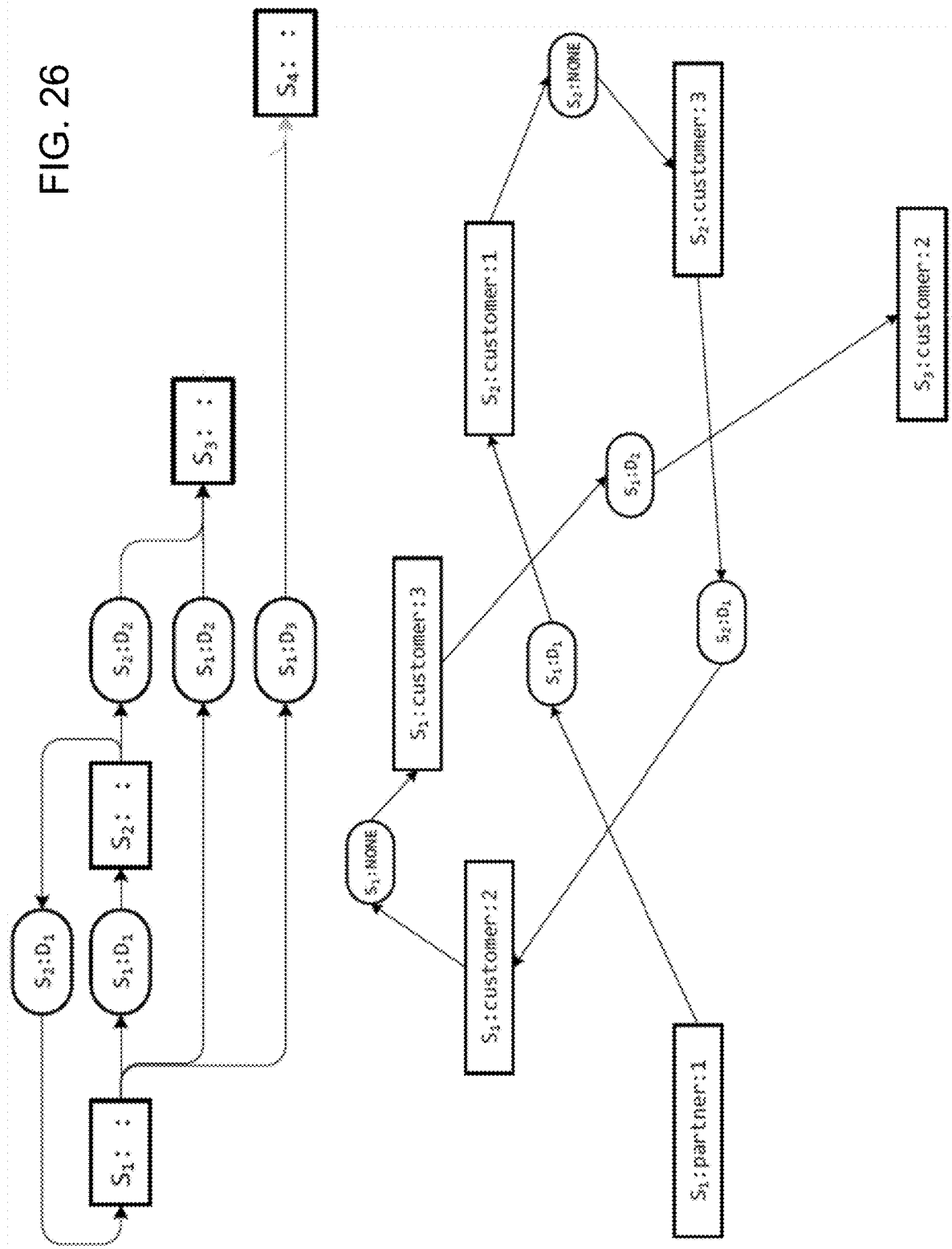

In step 9 the consolidation of MDES$_5$ and MDES$_5$', MI$_2$ and MI$_2$' as well as $C_1$ and $C_1$' takes place. This is shown in the table of FIG. 30J. The now available information (drawn in black) is depicted in FIG. 25. Still undiscovered information is not shown.

In step 10 the comparison of MI$_2$ and MI$_3$ shows that new mapping information is available ($I_2$).

Thus, in step 11 a repetition starting at step 1 is triggered where MDES$_1$ is filled with all master data entities of MDES$_6$ that reside in system $S_1$. New mapping information for $S_1$:customer:3 is found. This is shown in the table of FIG. 30K.

Step 2 results in an empty set MDES$_3$ as the found master data entities reside in another system (not the current one). Accordingly, MDES$_4$ contains $S_3$:customer:2. This is shown in the table of FIG. 30L.

In step 3 no repetition is performed because MDES$_3$ is empty.

Steps 4 and 5 result in MDES$_5$ and MI$_2$ as shown in the table of FIG. 30M. This is also highlighted (drawn in black, lower part of FIG. 26) and $C_1$ as highlighted (drawn in black, upper part of FIG. 26).

Step 6 just moves to the next step ($I_1$=all).

In step 7 the steps 1 to 6 are triggered in system $S_3$. Keep in mind we are at step 7 (2nd iteration) in system $S_1$ while we move on with step 1 in system $S_3$.

The execution of step 1 reveals the mapping between $S_3$:customer:2 and $S_3$:partner:3. $MDES_2$ and $MI_1$ are filled accordingly. This is shown in the table of FIG. 30N.

Step 2 results in set $MDES_3$ as $MDES_2$ only contains entities that reside in the current system and an empty $MDES_4$. This is shown in the table of FIG. 30O.

Step 3 leads to a repetition because $MDES_3$ is not empty. Thus, we start over with step 1 whereas $MDES_1$ is set to contain all entries of $MDES_3$ (here only one entry). As result the mapping to $S_4$:customer:2 is revealed. This is shown in the table of FIG. 30P.

Step 2 results in an empty $MDES_3'$ and a filled $MDES_4'$. This is shown in the table of FIG. 30Q.

In step 3 no repetition is performed because $MDES_3'$ is empty.

Step 4 results in the consolidation of $MDES_1$, $MDES_1'$, $MDES_2$, $MDES_2'$, $MDES_3$, $MDES_3'$ $MDES_4$ and $MDES_4'$ as well as $MI_1$ and $MI_1'$. Step 5 leverages the connection of system $S_3$. This is shown in the table of FIG. 30R.

Step 6 ends further processing and hands back the gathered information to system $S_1$ (due to I1='1-6').

Back in system $S_1$ the execution is continued at step 8. This is shown in the table of FIG. 30S.

Figure 27:
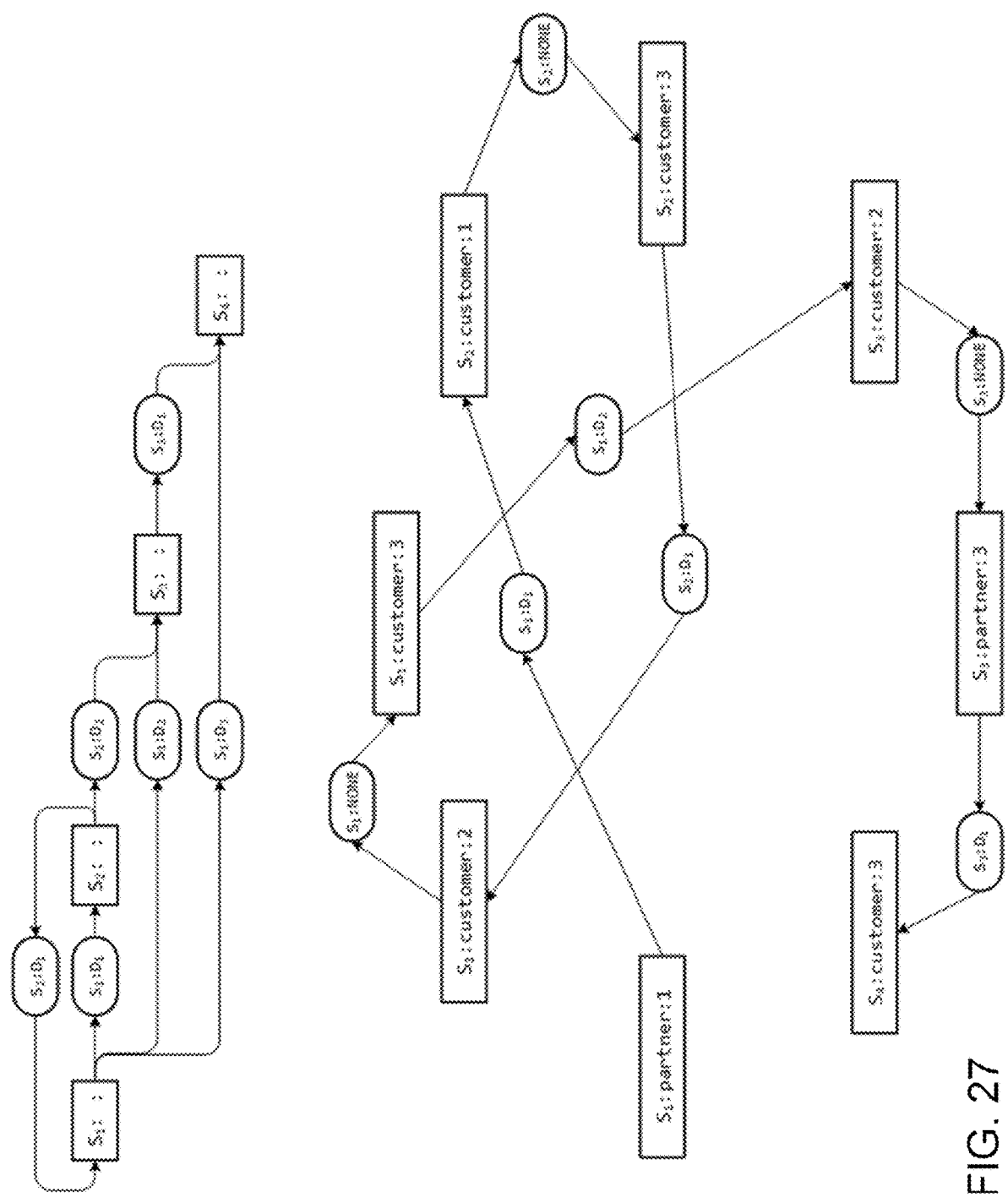

In step 9 the consolidation of $MDES_5$ and $MDES_5'$, $MI_2$ and $MI_2'$ as well as $C_1$ and $C_1'$ takes place. This is shown in the table of FIG. 30T. The now-available information is depicted in FIG. 27.

In step 10 the comparison of $MI_2$ and $MI_3$ shows that new mapping information is available ($I_2$).

Thus, in step 11 a repetition starting at step 1 is triggered where $MDES_1$ is filled with all master data entities of $MDES_6$ that reside in system $S_1$. The whole process starts over one more time. However, no new information is revealed.

Step 10 in the 3rd iteration will thus not trigger another iteration but lead to the end of the process.

The uniqueness of system IDs is now discussed. A mapping information record as described above, and usage as well as inference of mapping information relies on unique system IDs.

Considering the example above, if there are two systems identifying themselves as $S_1$, there could be a (partial) break-down or even misleading and incorrect mapping information.

For this reason ambiguous system IDs are disallowed. Rather system IDs must be unique considering all systems relevant for the mapping scenario.

One approach for unique system IDs where no central authority is needed to guarantee uniqueness, could be to employ UUIDs. System IDs are typically technical IDs. Humans get in touch with system IDs at configuration tasks. However, other approaches (including a central authority) that ensures uniqueness of system IDs may be used.

A piece of code/technology may be used to query system IDs. Like querying mapping information via a call from one system to another system, there is the same approach to query system IDs. Unlike mapping information, the system ID is just a single identifier.

Returning now to FIG. 1, there the particular embodiment is depicted with the engine responsible for mapping as being located outside of the database. However, this is not required.

Rather, alternative embodiments could leverage the processing power of an in-memory database engine (e.g., the in-memory database engine of the SAP HANA in-memory database available from SAP SE), in order to perform various functions.

Figure 28:
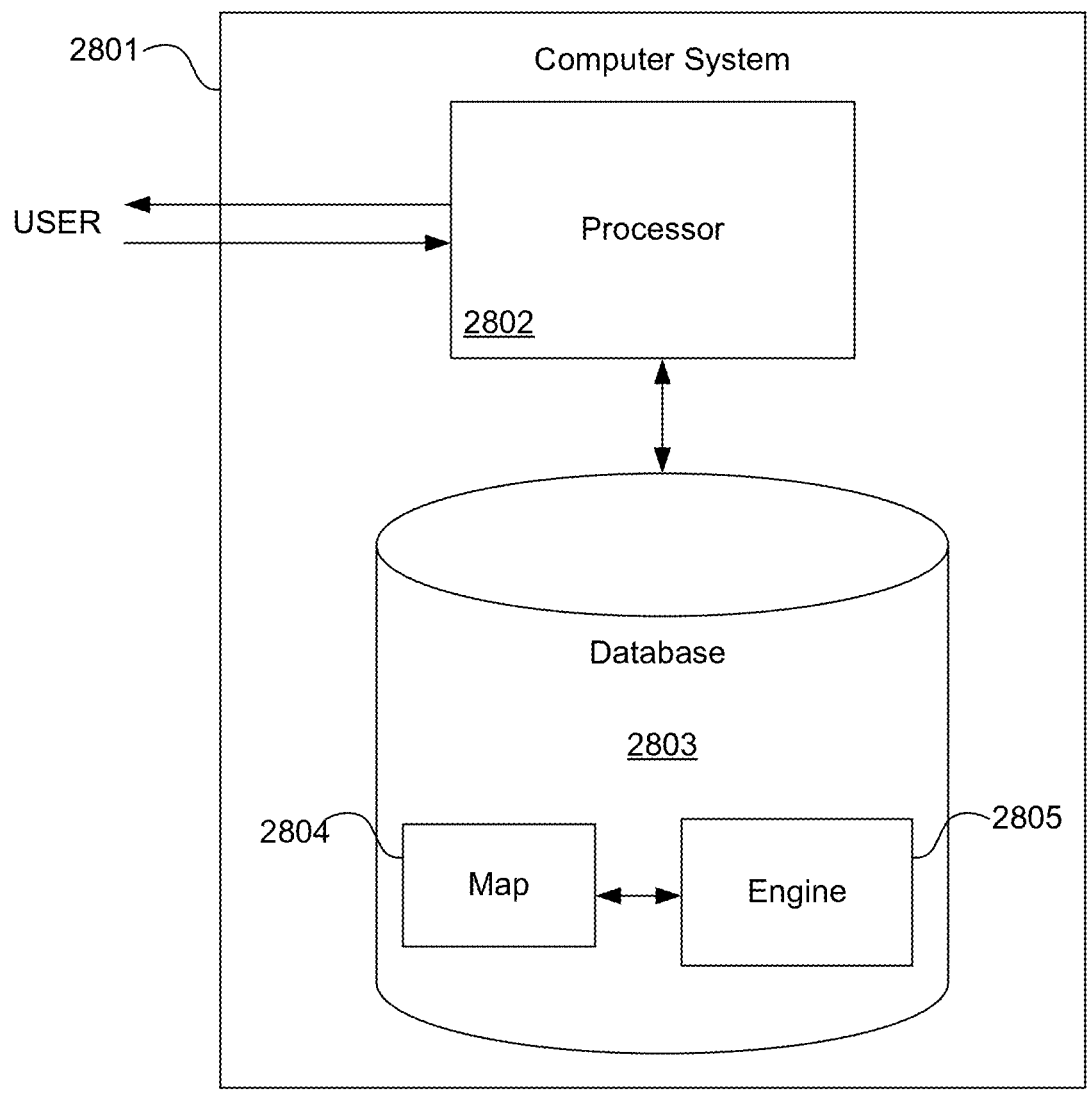
FIG. 28 illustrates hardware of a special purpose computing machine according to an embodiment that is configured to implement data mapping.

Thus FIG. 28 illustrates hardware of a special purpose computing machine configured to implement data mapping according to an embodiment. In particular, computer system 2801 comprises a processor 2802 that is in electronic communication with a non-transitory computer-readable storage medium comprising a database 2803. This computer-readable storage medium has stored thereon code 2805 corresponding to an engine. Code 2804 corresponds to a map. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 29:
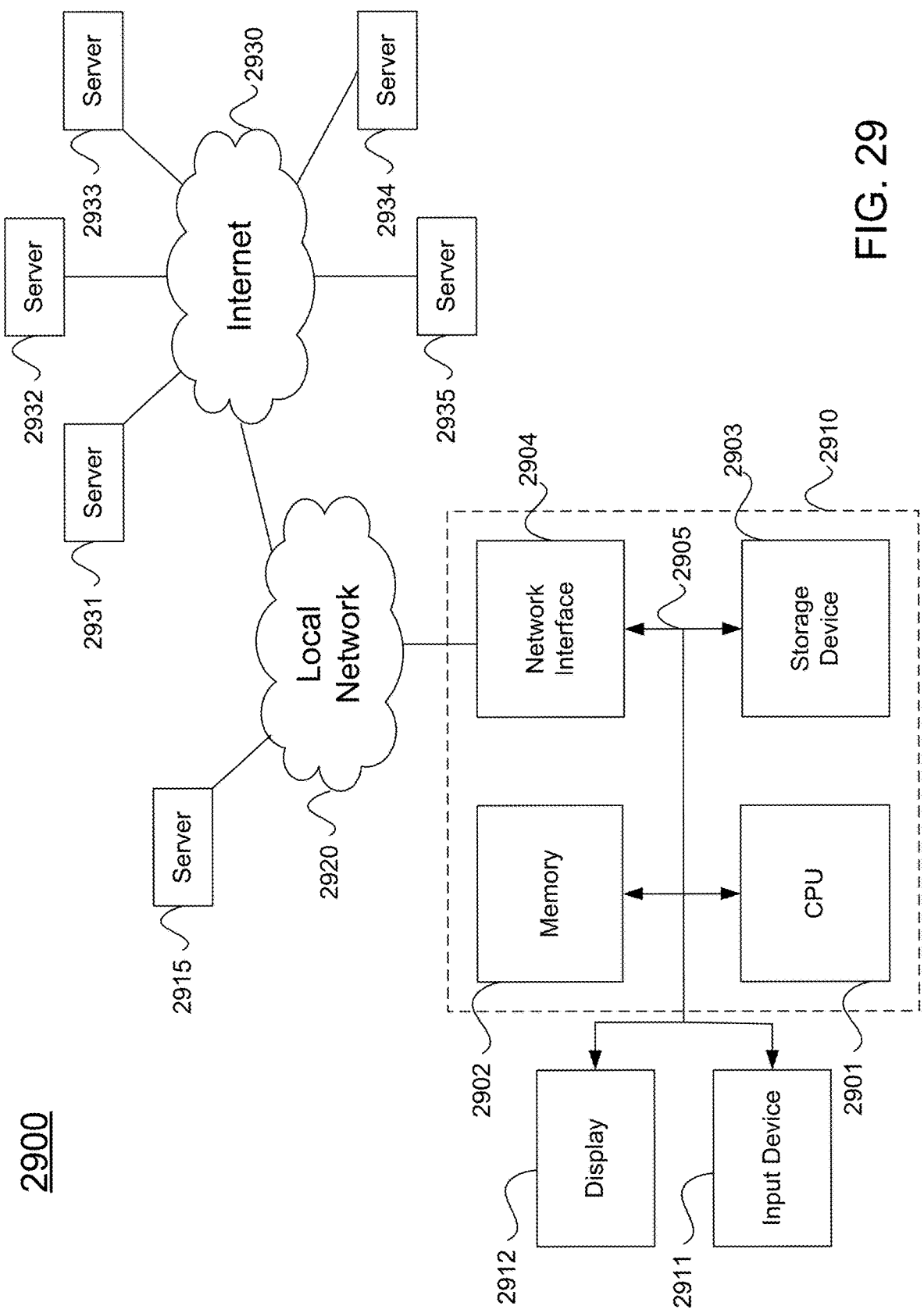
FIG. 29 illustrates an example computer system.

An example computer system 2900 is illustrated in FIG. 29. Computer system 2910 includes a bus 2905 or other communication mechanism for communicating information, and a processor 2901 coupled with bus 2905 for processing information. Computer system 2910 also includes a memory 2902 coupled to bus 2905 for storing information and instructions to be executed by processor 2901, including information and instructions for performing the techniques described above, for example. This memory may also be used for storing variables or other intermediate information during execution of instructions to be executed by processor 2901. Possible implementations of this memory may be, but are not limited to, random access memory (RAM), read only memory (ROM), or both. A storage device 2903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2903 may include source code, binary code, or software files for performing the techniques above, for example. Storage device and memory are both examples of computer readable mediums.

Computer system 2910 may be coupled via bus 2905 to a display 2912, such as a cathode ray tube (CRT) or liquid crystal display (LCD), for displaying information to a computer user. An input device 2911 such as a keyboard and/or mouse is coupled to bus 2905 for communicating information and command selections from the user to processor 2901. The combination of these components allows the user to communicate with the system. In some systems, bus 2905 may be divided into multiple specialized buses.

Computer system 2910 also includes a network interface 2904 coupled with bus 2905. Network interface 2904 may provide two-way data communication between computer system 2910 and the local network 2920. The network interface 2904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2904 sends and receives electrical, electromagnetic, or optical signals that carry digital data streams representing various types of information.

Computer system 2910 can send and receive information, including messages or other interface actions, through the network interface 2904 across a local network 2920, an Intranet, or the Internet 2930. For a local network, computer system 2910 may communicate with a plurality of other computer machines, such as server 2915. Accordingly, computer system 2910 and server computer systems represented by server 2915 may form a cloud computing network, which may be programmed with processes described herein. In the Internet example, software components or services may reside on multiple different computer systems 2910 or servers 2931-2935 across the network. The processes described above may be implemented on one or more servers, for example. A server 2931 may transmit actions or messages from one component, through Internet 2930, local network 2920, and network interface 2904 to a component on computer system 2910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   interrogating a system landscape to determine an explicit connection between a first piece of master data information present in a first system, and a second piece of master data information present in a second system;
   determining an inferred connection between the first piece of master data information and a third piece of master data information based upon the explicit connection, wherein the third piece of master data information is present in a third system;
   constructing a map comprising the explicit connection and the inferred connection, the map comprising a table including,
      a first field indicating a first system identifier of a source system of the first piece of master data information,
      a second field indicating a second system identifier of a destination system of the third piece of master data information, and
      a third field indicating a destination system of the second piece of master data information different from the destination system of the third piece of master data information;
   storing the map in a non-transitory computer readable storage medium;
   receiving a query comprising a parameter;
   executing the query upon the map to generate a query result comprising the first piece of master data information, the second piece of master data information, and the third piece of master data information; and
   storing the query result in the non-transitory computer-readable storage medium, wherein,
   the first, second and third pieces of master data information correspond to a same unique entity,
   the first piece of master data information comprises a first type value of a master data information type, and a first master data identifier,
   the second piece of master data information comprises a second type value of the master data information type, and a second master data identifier,
   the first type value is different from or equal to the second type value,
   the map is constructed after the query is received using the parameter as a boundary condition, and
   a first entry of the table comprises the explicit connection, and a second entry of the table comprises the inferred connection.

2. A method as in claim 1 wherein the first master data identifier is different from or equal to the second master data identifier.

3. A method as in claim 1 wherein:
   the non-transitory computer readable storage medium comprises an in-memory database; and
   the query is executed by an in-memory database engine of the in-memory database.

4. A method as in claim 3 wherein the map is constructed by the in-memory database engine.

5. A non-transitory computer readable storage medium embodying a computer program for performing a method, said method comprising:
   receiving a query comprising a parameter;
   referencing the parameter to interrogate a system landscape to determine an explicit connection between a first piece of master data information present in a first system, and a second piece of master data information present in a second system;
   determining an inferred connection between the first piece of master data information and a third piece of master data information based upon the explicit connection, wherein the third piece of master data information is present in a third system;
   constructing a map comprising the explicit connection and the inferred connection, the map comprising a table including,
      a first field indicating a first system identifier of a source system of the first piece of master data information,
      a second field indicating a second system identifier of a destination system of the third piece of master data information, and
      a third field indicating a destination system of the second piece of master data information different from the destination system of the third piece of master data information;
   storing the map in a non-transitory computer readable storage medium;
   executing the query upon the map to generate a query result comprising the first piece of master data information, the second piece of master data information, and the third piece of master data information; and
   storing the query result in the non-transitory computer-readable storage medium, wherein,
   the first, second and third pieces of master data information correspond to a same unique entity,
   the first piece of master data information comprises a first type value of a master data information type, and a first master data identifier,
   the second piece of master data information comprises a second type value of the master data information type, and a second master data identifier,
   the first type value is different from or equal to the second type value,
   the map is constructed after the query is received using the parameter as a boundary condition, and
   a first entry of the table comprises the explicit connection, and a second entry of the table comprises the inferred connection.

6. A non-transitory computer readable storage medium as in claim 5 wherein:

the non-transitory computer readable storage medium comprises an in-memory database; and the query is executed by an in-memory database engine of the in-memory database.

7. A non-transitory computer readable storage medium as in claim 6 wherein the map is constructed by the in-memory database engine.

8. A computer system comprising:

one or more processors;

a software program, executable on said computer system, the software program configured to cause an in-memory database engine of an in-memory database to:

interrogate a system landscape to determine an explicit connection between a first piece of master data information present in a first system, and a second piece of master data information present in a second system;

determine an inferred connection between the first piece of master data information and a third piece of master data information based upon the explicit connection, wherein the third piece of master data information is present in a third system;

construct a map comprising the explicit connection the inferred connection, the map comprising a table including, a first field indicating a first system identifier of a source system of the first piece of master data information, a second field indicating a second system identifier of a destination system of the third piece of master data information, and a third field indicating a destination system of the second piece of master data information different from the destination system of the third piece of master data information;

store the map in the in-memory database;

receive a query comprising a parameter;

execute the query upon the map to generate a query result comprising the first piece of master data information, the second piece of master data information, and the third piece of master data information; and store the query result in the in-memory database, wherein, the first, second and third pieces of master data information correspond to a same unique entity, the first piece of master data information comprises a first type value of a master data information type, and a first master data identifier, the second piece of master data information comprises a second type value of the master data information type, and a second master data identifier, the first type value is different from or equal to the second type value, the map is constructed after the query is received using the parameter as a boundary condition, and a first entry of the table comprises the explicit connection, and a second entry of the table comprises the inferred connection.

9. A computer system as in claim 8 wherein the first master data identifier is different from or equal to the second master data identifier.

10. A computer system as in claim 8 wherein the first connection is bi-directional.

\* \* \* \* \*